United States Patent
Bell et al.

(10) Patent No.: US 10,153,653 B1
(45) Date of Patent: Dec. 11, 2018

(54) SYSTEMS AND METHODS FOR USING APPLICATION PROGRAMMING INTERFACES TO CONTROL COMMUNICATIONS BETWEEN A TRANSMITTER AND A RECEIVER

(71) Applicant: ENERGOUS CORPORATION, San Jose, CA (US)

(72) Inventors: Douglas Bell, Pleasanton, CA (US); Michael Leabman, San Ramon, CA (US)

(73) Assignee: Energous Corporation, San Jose, CA (US)

( * ) Notice: Subject to any disclaimer, the term of this patent is extended or adjusted under 35 U.S.C. 154(b) by 440 days.

(21) Appl. No.: 14/586,542

(22) Filed: Dec. 30, 2014

Related U.S. Application Data

(63) Continuation-in-part of application No. 14/272,039, filed on May 7, 2014.

(51) Int. Cl.
 *H02J 7/02* (2016.01)
 *H04B 5/00* (2006.01)
 (Continued)

(52) U.S. Cl.
 CPC .............. *H02J 7/025* (2013.01); *H01F 38/14* (2013.01); *H02J 5/005* (2013.01); *H04B 5/0037* (2013.01)

(58) Field of Classification Search
 USPC .................................................. 307/104, 107
 See application file for complete search history.

(56) References Cited

U.S. PATENT DOCUMENTS

| | | |
|---|---|---|
| 787,412 A | 4/1905 | Tesla |
| 3,167,775 A | 1/1965 | Guertler |

(Continued)

FOREIGN PATENT DOCUMENTS

| | | |
|---|---|---|
| CN | 203826555 U | 9/2014 |
| CN | 104090265 A | 10/2014 |

(Continued)

OTHER PUBLICATIONS

International Search Report dated Sep. 12, 2014 corresponding to International Patent Application No. PCT/US2014/037072, 3 pages.

(Continued)

*Primary Examiner* — An Luu

(74) *Attorney, Agent, or Firm* — Morgan, Lewis & Bockius LLP

(57) ABSTRACT

The embodiments described herein include a transmitter that transmits a power transmission signal (e.g., radio frequency (RF) signal waves) to create a three-dimensional pocket of energy. At least one receiver can be connected to or integrated into electronic devices and receive power from the pocket of energy. A wireless power network may include a plurality of wireless power transmitters each with an embedded wireless power transmitter manager, including a wireless power manager application. The wireless power network may include a plurality of client devices with wireless power receivers. Wireless power receivers may include a power receiver application configured to communicate with the wireless power manager application. The wireless power manager application may include a device database where information about the wireless power network may be stored.

17 Claims, 15 Drawing Sheets

(51) Int. Cl.
  *H01F 38/14*  (2006.01)
  *H02J 5/00*  (2016.01)

(56) References Cited

U.S. PATENT DOCUMENTS

| | | | |
|---|---|---|---|
| 3,434,678 A | 5/1965 | Brown et al. |
| 3,696,384 A | 10/1972 | Lester |
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,200,759 A | 4/1993 | McGinnis |
| 5,211,471 A | 5/1993 | Rohrs |
| 5,548,292 A | 8/1996 | Hirshfield et al. |
| 5,556,749 A | 9/1996 | Mitsuhashi et al. |
| 5,568,088 A | 10/1996 | Dent et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,127,799 A | 10/2000 | Krishnan |
| 6,127,942 A | 10/2000 | Welle |
| 6,163,296 A | 12/2000 | Lier et al. |
| 6,289,237 B1 | 9/2001 | Mickle et al. |
| 6,329,908 B1 | 12/2001 | Frecska |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Arndt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,650,376 B1 | 11/2003 | Obitsu |
| 6,664,920 B1 | 12/2003 | Mott et al. |
| 6,798,716 B1 | 9/2004 | Charych |
| 6,803,744 B1 | 10/2004 | Sabo |
| 6,853,197 B1 | 2/2005 | McFarland |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,027,311 B2 | 4/2006 | Vanderelli et al. |
| 7,068,234 B2 | 6/2006 | Sievenpiper |
| 7,068,991 B2 | 6/2006 | Parise |
| 7,183,748 B1 | 2/2007 | Unno et al. |
| 7,191,013 B1 | 3/2007 | Miranda et al. |
| 7,196,663 B2 | 3/2007 | Bolzer et al. |
| 7,205,749 B2 | 4/2007 | Hagen et al. |
| 7,222,356 B1 | 5/2007 | Yonezawa et al. |
| 7,274,334 B2 | 9/2007 | o'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,392,068 B2 | 6/2008 | Dayan |
| 7,403,803 B2 | 7/2008 | Mickle et al. |
| 7,443,057 B2 | 10/2008 | Nunally |
| 7,451,839 B2 | 11/2008 | Perlman |
| 7,463,201 B2 | 12/2008 | Chiang et al. |
| 7,471,247 B2 | 12/2008 | Saily |
| 7,535,195 B1 | 5/2009 | Horovitz et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,679,576 B2 | 3/2010 | Riedel et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,911,386 B1 | 3/2011 | Ito et al. |
| 7,925,308 B2 | 4/2011 | Greene et al. |
| 7,948,208 B2 | 5/2011 | Partovi et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,228,194 B2 | 7/2012 | Mickle |
| 8,234,509 B2 | 7/2012 | Gioscia et al. |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,338,991 B2 | 12/2012 | Von Novak et al. |
| 8,362,745 B2 | 1/2013 | Tinaphong |
| 8,380,255 B2 | 2/2013 | Shearer et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |
| 8,497,601 B2 | 7/2013 | Hall et al. |
| 8,497,658 B2 | 7/2013 | Von Novak et al. |
| 8,552,597 B2 | 10/2013 | Song et al. |
| 8,558,661 B2 | 10/2013 | Zeine |
| 8,560,026 B2 | 10/2013 | Chanterac |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Kuusilinna et al. |
| 8,629,576 B2 | 1/2014 | Levine |
| 8,653,966 B2 | 2/2014 | Rao et al. |
| 8,674,551 B2 | 3/2014 | Low et al. |
| 8,686,685 B2 | 4/2014 | Moshfeghi |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,832,646 B1 | 9/2014 | Wendling |
| 8,854,176 B2 | 10/2014 | Zeine |
| 8,860,364 B2 | 10/2014 | Low et al. |
| 8,897,770 B1 | 11/2014 | Frolov et al. |
| 8,903,456 B2 | 12/2014 | Chu et al. |
| 8,917,057 B2 | 12/2014 | Hui |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 * | 4/2015 | Perry .................. H04B 11/00 320/107 |
| 9,006,934 B2 | 4/2015 | Kozakai et al. |
| 9,021,277 B2 | 4/2015 | Shearer et al. |
| 9,030,161 B2 | 5/2015 | Lu et al. |

(56) References Cited

U.S. PATENT DOCUMENTS

| | | |
|---|---|---|
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 * | 1/2016 | Cain .................. H04M 1/7253 |
| 9,252,628 B2 | 2/2016 | Leabman et al. |
| 9,270,344 B2 | 2/2016 | Rosenberg |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,711,999 B2 | 7/2017 | Hietala et al. |
| 9,723,635 B2 | 8/2017 | Nambord et al. |
| 9,793,758 B2 | 10/2017 | Leabman |
| 9,793,764 B2 | 10/2017 | Perry |
| 9,806,564 B2 | 10/2017 | Leabman |
| 9,819,230 B2 | 11/2017 | Petras et al. |
| 9,866,279 B2 | 1/2018 | Bell et al. |
| 2001/0027876 A1 | 10/2001 | Tsukamoto et al. |
| 2002/0001307 A1 | 1/2002 | Nguyen et al. |
| 2002/0024471 A1 | 2/2002 | Ishitobi |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0065052 A1 | 5/2002 | Pande et al. |
| 2002/0072784 A1 | 6/2002 | Sheppard et al. |
| 2002/0095980 A1 | 7/2002 | Breed et al. |
| 2002/0103447 A1 | 8/2002 | Terry |
| 2002/0133592 A1 | 9/2002 | Matsuda |
| 2002/0172223 A1 | 11/2002 | Stilp |
| 2003/0005759 A1 | 1/2003 | Breed et al. |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brian et al. |
| 2004/0036657 A1 | 2/2004 | Forster et al. |
| 2004/0066251 A1 | 4/2004 | Eleftheriades et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0196190 A1 | 10/2004 | Mendolia et al. |
| 2004/0203979 A1 | 10/2004 | Attar et al. |
| 2004/0207559 A1 | 10/2004 | Milosavljevic |
| 2004/0218759 A1 | 11/2004 | Yacobi |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0093766 A1 | 5/2005 | Turner |
| 2005/0116683 A1 | 6/2005 | Cheng |
| 2005/0117660 A1 | 6/2005 | Vialle et al. |
| 2005/0134517 A1 | 6/2005 | Gottl |
| 2005/0171411 A1 | 8/2005 | KenKnight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0237249 A1 | 10/2005 | Nagel |
| 2005/0237258 A1 | 10/2005 | Abramov et al. |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman et al. |
| 2006/0033674 A1 | 2/2006 | Essig, Jr. et al. |
| 2006/0071308 A1 | 4/2006 | Tang et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1 | 9/2007 | Greene et al. |
| 2007/0257634 A1 | 11/2007 | Leschin et al. |
| 2007/0273486 A1 | 11/2007 | Shiotsu |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |

(56) References Cited

U.S. PATENT DOCUMENTS

| | | |
|---|---|---|
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Aledander et al. |
| 2008/0110263 A1 | 5/2008 | Klessel et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0140278 A1 | 6/2008 | Breed |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0248758 A1 | 10/2008 | Schedelbeck et al. |
| 2008/0248846 A1 | 10/2008 | Stronach et al. |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0019183 A1 | 1/2009 | Wu et al. |
| 2009/0036065 A1 | 2/2009 | Siu |
| 2009/0047998 A1 | 2/2009 | Alberth, Jr. |
| 2009/0058354 A1 | 3/2009 | Harrison |
| 2009/0058361 A1 | 3/2009 | John |
| 2009/0058731 A1 | 3/2009 | Geary et al. |
| 2009/0067208 A1 | 3/2009 | Martin et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0157911 A1 | 6/2009 | Aihara |
| 2009/0200985 A1 | 8/2009 | Zane et al. |
| 2009/0206791 A1 | 8/2009 | Jung |
| 2009/0207090 A1 | 8/2009 | Pettus et al. |
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0264069 A1 | 10/2009 | Yamasuge |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0291634 A1 | 11/2009 | Saarisalo |
| 2009/0299175 A1 | 12/2009 | Bernstein et al. |
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0019908 A1 | 1/2010 | Cho et al. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0034238 A1 | 2/2010 | Bennett |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0082193 A1 | 4/2010 | Chiappetta |
| 2010/0087227 A1 | 4/2010 | Francos et al. |
| 2010/0090524 A1 | 4/2010 | Obayashi |
| 2010/0090656 A1 | 4/2010 | Shearer et al. |
| 2010/0109443 A1 | 5/2010 | Cook et al. |
| 2010/0117926 A1 | 5/2010 | DeJean, II |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156721 A1 | 6/2010 | Alamouti et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0171461 A1 | 7/2010 | Baarman et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0225270 A1 | 9/2010 | Jacobs et al. |
| 2010/0227570 A1 | 9/2010 | Hendin |
| 2010/0231470 A1 | 9/2010 | Lee et al. |
| 2010/0237709 A1 | 9/2010 | Hall et al. |
| 2010/0244576 A1 | 9/2010 | Hillan et al. |
| 2010/0256831 A1 | 10/2010 | Abramo et al. |
| 2010/0259110 A1 | 10/2010 | Kurs et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277121 A1 | 11/2010 | Hall et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |

(56) References Cited

U.S. PATENT DOCUMENTS

| | | |
|---|---|---|
| 2011/0109167 A1 | 5/2011 | Park et al. |
| 2011/0114401 A1 | 5/2011 | Kanno et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tarng et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0151789 A1 | 6/2011 | Viglione et al. |
| 2011/0154429 A1 | 6/2011 | Stantchev |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0080957 A1 | 4/2012 | Cooper et al. |
| 2012/0086284 A1 | 4/2012 | Capanella et al. |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0187851 A1 | 8/2012 | Huggins et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306705 A1 | 12/2012 | Sakurai et al. |
| 2012/0306707 A1 | 12/2012 | Yang et al. |
| 2012/0306720 A1 | 12/2012 | Tanmi et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313449 A1 | 12/2012 | Kurs |
| 2012/0326660 A1 | 12/2012 | Lu et al. |
| 2013/0002550 A1 | 1/2013 | Zalewski |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0063082 A1 | 3/2013 | Lee et al. |

(56) References Cited

U.S. PATENT DOCUMENTS

| | | |
|---|---|---|
| 2013/0063143 A1 | 3/2013 | Adalsteinsson et al. |
| 2013/0069444 A1 | 3/2013 | Waffenschmidt et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119929 A1 | 5/2013 | Partovi |
| 2013/0120217 A1 | 5/2013 | Ueda et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278209 A1 | 10/2013 | Von Novak |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0293423 A1 | 11/2013 | Moshfeghi |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343251 A1 | 12/2013 | Zhang |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008992 A1 | 1/2014 | Leabman |
| 2014/0008993 A1 | 1/2014 | Leabman |
| 2014/0009108 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yu et al. |
| 2014/0021908 A1 | 1/2014 | McCool |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0103869 A1 | 4/2014 | Radovic |
| 2014/0111147 A1 | 4/2014 | Soar |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0177399 A1 | 6/2014 | Teng et al. |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0194092 A1 | 7/2014 | Wanstedt et al. |
| 2014/0194095 A1 | 7/2014 | Wanstedt et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0300452 A1 | 10/2014 | Rofe et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |

(56) References Cited

U.S. PATENT DOCUMENTS

| | | |
|---|---|---|
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0357309 A1 | 12/2014 | Leabman et al. |
| 2014/0368048 A1 | 12/2014 | Leabman |
| 2014/0368161 A1 | 12/2014 | Leabman et al. |
| 2014/0368405 A1 | 12/2014 | Ek et al. |
| 2014/0375139 A1 | 12/2014 | Tsukamoto |
| 2014/0375253 A1 | 12/2014 | Leabman et al. |
| 2014/0375255 A1 | 12/2014 | Leabman et al. |
| 2014/0375258 A1 | 12/2014 | Arkhipenkov |
| 2014/0375261 A1 | 12/2014 | Manova-Elssibony et al. |
| 2014/0376646 A1 | 12/2014 | Leabman et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabamn |
| 2015/0015194 A1 | 1/2015 | Leabman et al. |
| 2015/0015195 A1 | 1/2015 | Leabman et al. |
| 2015/0021990 A1 | 1/2015 | Myer et al. |
| 2015/0022008 A1 | 1/2015 | Leabman et al. |
| 2015/0022009 A1 | 1/2015 | Leabman et al. |
| 2015/0022010 A1 | 1/2015 | Leabman et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0028875 A1 | 1/2015 | Irie et al. |
| 2015/0029397 A1 | 1/2015 | Leabman et al. |
| 2015/0035378 A1 | 2/2015 | Calhoun et al. |
| 2015/0035715 A1 | 2/2015 | Kim et al. |
| 2015/0041459 A1 | 2/2015 | Leabman et al. |
| 2015/0042264 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097663 A1 | 4/2015 | Sloo et al. |
| 2015/0102681 A1 | 4/2015 | Leabman et al. |
| 2015/0102764 A1 | 4/2015 | Leabman et al. |
| 2015/0102769 A1 | 4/2015 | Leabman et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0123483 A1 | 5/2015 | Leabman et al. |
| 2015/0123496 A1 | 5/2015 | Leabman et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162751 A1 | 6/2015 | Leabman et al. |
| 2015/0162779 A1 | 6/2015 | Lee et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0188352 A1 | 7/2015 | Peek et al. |
| 2015/0199665 A1 | 7/2015 | Chu |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0236520 A1 | 8/2015 | Baarman |
| 2015/0244070 A1 | 8/2015 | Cheng et al. |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0263534 A1 | 9/2015 | Lee et al. |
| 2015/0263548 A1 | 9/2015 | Cooper |
| 2015/0270741 A1 | 9/2015 | Leabman et al. |
| 2015/0280484 A1 | 10/2015 | Radziemski et al. |
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326025 A1 | 11/2015 | Bell et al. |
| 2015/0326063 A1 | 11/2015 | Leabman et al. |
| 2015/0326068 A1 | 11/2015 | Bell et al. |
| 2015/0326069 A1 | 11/2015 | Petras et al. |
| 2015/0326070 A1 | 11/2015 | Petras et al. |
| 2015/0326072 A1 | 11/2015 | Petras et al. |
| 2015/0326142 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leabman |
| 2015/0333529 A1 | 11/2015 | Leabman |
| 2015/0333573 A1 | 11/2015 | Leabman |
| 2015/0333800 A1 | 11/2015 | Perry et al. |
| 2015/0340759 A1 | 11/2015 | Bridgelall et al. |
| 2015/0340903 A1 | 11/2015 | Bell et al. |
| 2015/0340909 A1 | 11/2015 | Bell et al. |
| 2015/0340910 A1 | 11/2015 | Petras et al. |
| 2015/0340911 A1 | 11/2015 | Bell et al. |
| 2015/0341087 A1 | 11/2015 | Moore et al. |
| 2015/0349574 A1 | 12/2015 | Leabman |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013656 A1 | 1/2016 | Bell et al. |
| 2016/0013677 A1 | 1/2016 | Bell et al. |
| 2016/0013678 A1 | 1/2016 | Bell et al. |
| 2016/0013855 A1 | 1/2016 | Campos |
| 2016/0020636 A1 | 1/2016 | Khlat |
| 2016/0020649 A1 | 1/2016 | Bell et al. |
| 2016/0020830 A1 | 1/2016 | Bell et al. |
| 2016/0042206 A1 | 2/2016 | Pesavento et al. |
| 2016/0054395 A1 | 2/2016 | Bell et al. |
| 2016/0054396 A1 | 2/2016 | Bell et al. |
| 2016/0054440 A1 | 2/2016 | Younis |
| 2016/0056635 A1 | 2/2016 | Bell |
| 2016/0056640 A1 | 2/2016 | Mao |
| 2016/0056669 A1 | 2/2016 | Bell |
| 2016/0056966 A1 | 2/2016 | Bell |
| 2016/0065005 A1 | 3/2016 | Won et al. |
| 2016/0079799 A1 | 3/2016 | Khlat |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099602 A1 | 4/2016 | Leabman et al. |
| 2016/0099609 A1 | 4/2016 | Leabman et al. |
| 2016/0099610 A1 | 4/2016 | Leabman et al. |
| 2016/0099611 A1 | 4/2016 | Leabman et al. |
| 2016/0099612 A1 | 4/2016 | Leabman et al. |
| 2016/0099613 A1 | 4/2016 | Leabman et al. |
| 2016/0099614 A1 | 4/2016 | Leabman et al. |
| 2016/0099755 A1 | 4/2016 | Leabman et al. |
| 2016/0099756 A1 | 4/2016 | Leabman et al. |
| 2016/0099757 A1 | 4/2016 | Leabman et al. |
| 2016/0099758 A1 | 4/2016 | Leabman et al. |
| 2016/0100124 A1 | 4/2016 | Leabman et al. |
| 2016/0100312 A1 | 4/2016 | Bell et al. |
| 2016/0126752 A1 | 5/2016 | Vuori et al. |
| 2016/0126776 A1 | 5/2016 | Kim et al. |

(56) References Cited

U.S. PATENT DOCUMENTS

| | | |
|---|---|---|
| 2016/0141908 A1 | 5/2016 | Jakl et al. |
| 2016/0164563 A1 | 6/2016 | Khawand et al. |
| 2016/0181849 A1 | 6/2016 | Govindaraj |
| 2016/0181854 A1 | 6/2016 | Leabman |
| 2016/0181867 A1 | 6/2016 | Daniel et al. |
| 2016/0181873 A1 | 6/2016 | Mitcheson et al. |
| 2016/0191121 A1 | 6/2016 | Bell |
| 2016/0204622 A1 | 7/2016 | Leabman |
| 2016/0204642 A1 | 7/2016 | Oh |
| 2016/0238365 A1 | 8/2016 | Wixey et al. |
| 2016/0299210 A1 | 10/2016 | Zeine |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0359367 A1 | 12/2016 | Rothschild |
| 2017/0005481 A1 | 1/2017 | Von Novak, III |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0025903 A1 | 1/2017 | Song et al. |
| 2017/0026087 A1 | 1/2017 | Tanabe |
| 2017/0043675 A1 | 2/2017 | Jones et al. |
| 2017/0047784 A1 | 2/2017 | Jung et al. |
| 2017/0077735 A1 | 3/2017 | Leabman |
| 2017/0077736 A1 | 3/2017 | Leabman |
| 2017/0077764 A1 | 3/2017 | Bell et al. |
| 2017/0077765 A1 | 3/2017 | Bell et al. |
| 2017/0077995 A1 | 3/2017 | Leabman |
| 2017/0085120 A1 | 3/2017 | Leabman et al. |
| 2017/0085437 A1 | 3/2017 | Condeixa et al. |
| 2017/0092115 A1 | 3/2017 | Sloo et al. |
| 2017/0110887 A1 | 4/2017 | Bell et al. |
| 2017/0110914 A1 | 4/2017 | Bell |
| 2017/0134686 A9 | 5/2017 | Leabman |
| 2017/0163076 A1 | 6/2017 | Park et al. |
| 2017/0179763 A9 | 6/2017 | Leabman |

FOREIGN PATENT DOCUMENTS

| | | |
|---|---|---|
| DE | 2000216655 U1 | 2/2002 |
| EP | 1028482 A2 | 8/2000 |
| EP | 1081506 A1 | 3/2001 |
| EP | 2397973 A1 | 6/2010 |
| EP | 2346136 A1 | 7/2011 |
| EP | 2545635 | 9/2011 |
| GB | 2404497 A | 2/2005 |
| JP | 2006157586 A | 6/2006 |
| JP | 2007043432 A | 2/2007 |
| JP | 2008167017 A | 7/2008 |
| KR | 20060061776 A | 6/2006 |
| KR | 20070044302 A | 4/2007 |
| KR | 100755144 B1 | 9/2007 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 1020130026977 A | 3/2013 |
| WO | 9952173 A2 | 10/1999 |
| WO | WO 200111716 A1 | 2/2001 |
| WO | 2004077550 A1 | 9/2004 |
| WO | 2003091943 A1 | 11/2006 |
| WO | WO 2006122783 | 11/2006 |
| WO | 2008156571 A2 | 12/2008 |
| WO | 2010022181 A1 | 2/2010 |
| WO | WO 2010039246 A1 | 4/2010 |
| WO | WO 2010138994 A1 | 12/2010 |
| WO | 2011112022 A2 | 9/2011 |
| WO | WO 2012177283 A1 | 12/2012 |
| WO | 2013035190 A1 | 3/2013 |
| WO | WO 2013031988 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2014075103 A1 | 5/2014 |
| WO | WO 2014132258 A1 | 9/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015161323 A1 | 10/2015 |
| WO | WO 2016024869 A1 | 2/2016 |
| WO | WO 2016048512 A1 | 3/2016 |
| WO | WO 2016187357 A1 | 11/2016 |

OTHER PUBLICATIONS

International Search Report dated Jan. 27, 2015 corresponding to International Patent Application No. PCT/US2014/037170, 4 pages.

International Search Report dated Oct. 16, 2014 corresponding to International Patent Application No. PCT/US2014/041546, 4 pages.

International Search Report dated Oct. 13, 2014 corresponding to International Patent Application No. PCT/US2014/041534, 4 pages.

International Search Report dated Nov. 12, 2014 corresponding to International Patent Application No. PCT/US2014/046956, 4 pages.

Written Opinion of the International Searching Authority dated Nov. 12, 2014 corresponding to International Patent Application No. PCT/US2014/046956, 6 pages.

Energous Corp., Written Opinion, PCT/US2014/037170, dated Sep. 15, 2014, 7 pgs.

Energous Corp., IPRP, PCT/US2014/037170, dated Nov. 10, 2015, 8 pgs.

Energous Corp., Written Opinion, PCT/US2014/041534, dated Oct. 13, 2014, 6 pgs.

Energous Corp., IPRP, PCT/US2014/041534, dated Dec. 29, 2015, 7 pgs.

Energous Corp., IPRP, PCT/US2014/046956, dated Jan. 19, 2016, 7 pgs.

Energous Corp., Written Opinion, PCT/US2014/037072, dated Sep. 12, 2014, 5 pgs.

Energous Corp., IPRP, PCT/US2014/037072, dated Nov. 10, 2015, 6 pgs.

Energous Corp., ISRWO, PCT/US2014/068568, dated Mar. 20, 2015, 10 pgs.

Energous Corp., IPRP, PCT/US2014/068568, dated Jun. 14, 2016, 8 pgs.

Energous Corp., ISRWO, PCT/US2014/055195, dated Dec. 22, 2014, 11 pgs.

Energous Corp., IPRP, PCT/US2014/055195, dated Mar. 22, 2016, 9 pgs.

Energous Corp., ISRWO, PCT/US2015/067291, dated Mar. 4, 2016, 10 pgs.

Energous Corp., IPRP, PCT/US2015/067291, dated Jul. 4, 2017, 4 pgs.

Energous Corp., ISRWO, PCT/US2015/067242, dated Mar. 16, 2016, 9 pgs.

Energous Corp., IPRP, PCT/US2015/067242, dated Jun. 27, 2017, 7 pgs.

Energous Corp., ISRWO, PCT/US2015/067243, dated Mar. 10, 2016, 11 pgs.

Energous Corp., IPRP, PCT/US2015/067243, dated Jun. 27, 2017, 7 pgs.

Energous Corp., ISRWO, PCT/US2014/037109, dated Apr. 8, 2016, 12 pgs.

Energous Corp., IPRP, PCT/US2014/037109, dated Apr. 12, 2016, 9 pgs.

Energous Corp., ISRWO, PCT/US2015/067275, dated Mar. 3, 2016, 8 pgs.

Energous Corp., IPRP, PCT/US2015/067275, dated Jul. 4, 2017, 7 pgs.

Energous Corp., ISRWO, PCT/US2015/067245, dated Mar. 17, 2016, 8 pgs.

Energous Corp., IPRP, PCT/US2015/067245, dated Jun. 27, 2017, 7 pgs.

Energous Corp., ISRWO, PCT/US2014/041546, dated Oct. 16, 2014, 12 pgs.

(56) References Cited

OTHER PUBLICATIONS

Energous Corp., IPRP, PCT/US2014/041546, dated Dec. 29, 2015, 9 pgs.
Energous Corp., ISRWO, PCT/US2015/67250, dated Mar. 30, 2016, 11 pgs.
Energous Corp., IPRP, PCT/US2015/67250, dated Mar. 30, 2016, 10 pgs.
Energous Corp., ISRWO, PCT/US2015/067325, dated Mar. 10, 2016, 9 pgs.
Energous Corp., IPRP, PCT/US2015/067325, dated Jul. 4, 2017, 8 pgs.
Energous Corp., ISRWO, PCT/US2014/040697, dated Oct. 1, 2014, 12 pgs.
Energous Corp., IPRP, PCT/US2014/040697, dated Dec. 8, 2015, 9 pgs.
Energous Corp., ISRWO, PCT/US2014/040705, dated Sep. 23, 2014, 8 pgs.
Energous Corp., IPRP, PCT/US2014/040705, dated Dec. 8, 2015, 6 pgs.
Energous Corp., ISRWO, PCT/US2015/067249, dated Mar. 29, 2016, 8 pgs.
Energous Corp., IPRP, PCT/US2015/067249, dated Jun. 27, 2017, 7 pgs.
Energous Corp., ISRWO, PCT/US2015/067246, dated May 11, 2016, 18 pgs.
Energous Corp., IPRP, PCT/US2015/067246, dated Jun. 27, 2017, 9 pgs.
Energous Corp., ISRWO, PCT/US2014/059317, dated Feb. 24, 2015, 13 pgs.
Energous Corp., IPRP, PCT/US2014/059317, dated Apr. 12, 2016, 10 pgs.
Energous Corp., ISRWO, PCT/US2014/049669, dated Nov. 13, 2014, 10 pgs.
Energous Corp., IPRP, PCT/US2014/049669, dated Feb. 9, 2016, 8 pgs.
Energous Corp., ISRWO, PCT/US2014/041323, dated Oct. 1, 2014, 10 pgs.
Energous Corp., IPRP, PCT/US2014/041323, dated Dec. 22, 2015, 8 pgs.
Energous Corp., ISRWO, PCT/US2014/048002, dated Nov. 13, 2014, 11 pgs.
Energous Corp., IPRP, PCT/US2014/048002, dated Feb. 12, 2015 8 pgs.
Energous Corp., ISRWO, PCT/US2014/062682, dated Feb. 12, 2015, 10 pgs.
Energous Corp., IPRP, PCT/US2014/062682, dated May 3, 2016, 8 pgs.
Energous Corp., ISRWO, PCT/US2014/049666, dated Nov. 10, 2014, 7 pgs.
Energous Corp., IPRP, PCT/US2014/049666, dated Feb. 9, 2016, 5 pgs.
Energous Corp., ISRWO, PCT/US2014/046961, dated Nov. 24, 2014, 16 pgs.
Energous Corp., IPRP, PCT/US2014/046961, dated Jan. 19, 2016, 8 pgs.
Energous Corp., ISRWO, PCT/US2015/067279, dated Mar. 11, 2015, 13 pgs.
Energous Corp., IPRP, PCT/US2015/067279, dated Jul. 4, 2017, 7 pgs.
Energous Corp., ISRWO, PCT/US2014/041342, dated Jan. 27, 2015, 10 pgs.
Energous Corp., IPRP, PCT/US2014/041342, dated Dec. 15, 2015, 8 pgs.
Energous Corp., ISRWO, PCT/US2014/046941, dated Nov. 6, 2014, 11 pgs.
Energous Corp., IPRP, PCT/US2014/046941, dated Jan. 19, 2016, 9 pgs.
Energous Corp., ISRWO, PCT/US2014/062661, dated Jan. 27, 2015, 123 pgs.
Energous Corp., IPRP, PCT/US2014/062661, dated May 3, 2016, 10 pgs.
Energous Corp., ISRWO, PCT/US2014/059871, dated Jan. 23, 2015, 12 pgs.
Energous Corp., IPRP, PCT/US2014/059871, dated Apr. 12, 2016, 9 pgs.
Energous Corp., ISRWO, PCT/US2014/045102, dated Oct. 28, 2014, 14 pgs.
Energous Corp., IPRP, PCT/US2014/045102, dated Jan. 12, 2016, 11 pgs.
Energous Corp., ISRWO, PCT/US2014/059340, dated Jan. 15, 2015, 13 pgs.
Energous Corp., IPRP, PCT/US2014/059340, dated Apr. 12, 2016, 11 pgs.
Energous Corp., ISRWO, PCT/US2015/067282, dated Jul. 5, 2016, 7 pgs.
Energous Corp., IPRP, PCT/US2015/067282, dated Jul. 4, 2017, 6 pgs.
Energous Corp., ISRWO, PCT/US2014/041558, dated Oct. 10, 2014, 8 pgs.
Energous Corp., IPRP, PCT/US2014/041558, dated Dec. 29, 2015, 6 pgs.
Energous Corp., ISRWO, PCT/US2014/045119, dated Oct. 13, 2014, 11 pgs.
Energous Corp., IPRP, PCT/US2014/045119, dated Jan. 12, 2016, 9 pgs.
Energous Corp., ISRWO PCT/US2014/045237, dated Oct. 13, 2014, 16 pgs.
Energous Corp., IPRP, PCT/US2014/045237, dated Jan. 12, 2016, 12 pgs.
Energous Corp., ISRWO , PCT/US2014/054897, dated Feb. 17, 2015, 10 pgs.
Energous Corp., IPRP, PCT/US2014/054897, dated Mar. 15, 2016, 8 pgs.
Energous Corp., ISRWO, PCT/US2015/067334, dated Mar. 3, 2016, 6 pgs.
Energous Corp., IPRP, PCT/US2015/067334, dated Jul. 4, 2017, 5 pgs.
Energous Corp., ISRWO, PCT/US2014/047963, dated Nov. 7, 2014, 13 pgs.
Energous Corp., IPRP, PCT/US2014/047963, dated Jan. 26, 2016, 10 pgs.
Energous Corp., ISRWO, PCT/US2014/054891, dated Dec. 18, 2014, 12 pgs.
Energous Corp., IPRP, PCT/US2014/054891, dated Mar. 15, 2016, 10 pgs.
Energous Corp., ISRWO, PCT/US2014/054953, dated Dec. 4, 2014, 7 pgs.
Energous Corp., IPRP, PCT/US2014/054953, dated Mar. 22, 2016, 5 pgs.
Energous Corp., ISRWO, PCT/US2015/067294, dated Mar. 29, 2016, 7 pgs.
Energous Corp., IPRP, PCT/US2015/067294, dated Jul. 4, 2017, 6 pgs.
Energous Corp., ISRWO, PCT/US2014/062672 dated Jan. 26, 2015, 11 pgs.
Energous Corp., IPRP, PCT/US2014/062672 dated May 10, 2016, 8 pgs.
Energous Corp., ISRWO, PCT/US2014/044810 dated Oct. 21, 2014, 12 pgs.
Energous Corp., IPRP, PCT/US2014/044810, dated Jan. 5, 2016, 10 pgs.
Energous Corp., ISRWO, PCT/US2015/067271, dated Mar. 11, 2016, 6 pgs.
Energous Corp., IPRP, PCT/US2015/067271, dated Jul. 4, 2017, 5 pgs.
Energous Corp., ISRWO, PCT/US2014/040648, dated Oct. 10, 2014, 11 pgs.
Energous Corp., IPRP, PCT/US2014/040648, dated Dec. 8, 2015, 8 pgs.
Energous Corp., ISRWO, PCT/US2014/049673, dated Nov. 18, 2014, 10 pgs.

(56) References Cited

OTHER PUBLICATIONS

Energous Corp., IPRP, PCT/US2014/049673, dated Feb. 9, 2016, 6 pgs.
Energous Corp., ISRWO, PCT/US2014/068282, dated Mar. 19, 2015, 13 pgs.
Energous Corp., IPRP, PCT/US2014/068282, dated Jun. 7, 2016, 10 pgs.
Energous Corp., ISRWO, PCT/US2014/068586, dated Mar. 20, 2015, 11 pgs.
Energous Corp., IPRP, PCT/US2014/068586, dated Jun. 14, 2016, 8 pgs.
Energous Corp., ISRWO, PCT/US2016/068504, dated Mar. 30, 2017, 8 pgs.
Energous Corp., ISRWO, PCT/US2016/068495, dated Mar. 30, 2017, 9 pgs.
Energous Corp., ISRWO, PCT/US2015/067287, dated Feb. 2, 2016, 8 pgs.
Energous Corp., IPRP, PCT/US2015/067287, dated Jul. 4, 2017, 6 pgs.
Energous Corp., ISRWO, PCT/US2016/068551, dated Mar. 17, 2017, 8 pgs.
Energous Corp., ISRWO, PCT/US2016/068498, dated May 17, 2017, 8 pgs.
Energous Corp., ISRWO, PCT/US2016/068993, dated Mar. 13, 2017, 12 pgs.
Energous Corp., ISRWO, PCT/US2016/068565, dated Mar. 8, 2017, 11 pgs.
Energous Corp., ISRWO, PCT/US2016/068987, dated May 8, 2017, 10 pgs.
Energous Corp., ISRWO, PCT/US2016/069316 , dated Mar. 16, 2017, 15 pgs.
Supplementary European Search Report, EP Patent Application No. EP14818136-5, dated Jul. 21, 2016, 9 pgs.
European Search Report, EP Patent Application No. EP16189052.0, dated Jan. 31, 2017, 11 pgs.
European Search Report, EP Patent Application No. EP16189319-3, dated Feb. 1, 2017, 9 pgs.
European Search Report, EP Patent Application No. EP14822971, dated Feb. 1, 2017, 9 pgs.
European Search Report, EP Patent Application No. EP16189987, dated Feb. 1, 2017, 8 pgs.
European Search Report, EP Patent Application No. 16196205.5, dated Mar. 28, 2017, 7 pgs.
European Search Report, EP Patent Application No. 16189300, dated Feb. 28, 2017, 4 pgs.
European Search Report, EP Patent Application No. 16189988.5, dated Mar. 1, 2017, 4 pgs.
European Search Report, EP Patent Application No. 16189982.5, dated Jan. 27, 2017, 9 pgs.
European Search Report, EP Patent Application No. 16189974, dated Mar. 2, 2017, 5 pgs.
European Search Report, EP Patent Application No. 16193743, dated Feb. 2, 2017, 5 pgs.
European Search Report, EP Patent Application No. 14868901.1, dated Jul. 7, 2017, 5 pgs.
L.H. Hsieh et al. Development of a Retrodirective Wireless Microwave Power Transmission System, IEEE, 2003 pp. 393-396.
B.D. Van Veen et al., Beamforming: A Versatile Approach to Spatial Filtering, IEEE, ASSP Magazine, Apr. 1988, pp. 4-24.
Leabman, Adaptive Band-partitioning for Interference Cancellation in Communication System, Thesis Massachusetts Institute of Technology, Feb. 1997, pp. 1-70.
Panda, SIW based Slot Array Antenna and Power Management Circuit for Wireless Energy Harvesting Applications, IEEE APSURSI, Jul. 2012, 2 pgs.

Singh, Wireless Power Transfer Using Metamaterial Bonded Microstrip Antenna for Smart Grid WSN: In Fourth International Conference on Advances in Computing and Communications (ICACC), Aug. 27-29, 2014, Abstract 299.
T. Gill et al. "A System for Change Detection and Human Recognition in Voxel Space using the Microsoft Kinect Sensor," 2011 IEEE Applied Imagery Pattern Recognition Workshop. 8 pgs.
J. Han et al. Enhanced Computer Vision with Microsoft Kinect Sensor: A Review, IEEE Transactions on Cybernetics vol. 43, No. 5. pp. 1318-1334.
Zhai, "A Practical wireless charging system based on ultrawideband retro-reflective beamforming" 2010 IEEE Antennas and Propagation Society International Symposium, Toronto, ON 2010, pp. 1-4.
Mao: BeamStar: An Edge-Based Approach to Routing in Wireless Sensors Networks, IEEE Transactions on Mobile Computing, IEEE Service Center, Los Alamitos, CA US, vol. 6, No. 11, Nov. 1, 2007, 13 pgs.
Smolders—Institute of Electrical 1—15 and Electronics Engineers: "Broadband microstrip array antennas" Digest of the Antennas and Propagation Society International Symposium. Seattle, WA Jun. 19-24, 1994. Abstract 3 pgs.
Paolo Nenzi et al; "U-Helix: On-chip short conical antenna", 2013 7th European Conference on Antennas and Propagation (EUCAP), ISBN:978-1-4673-2187-7, IEEE, Apr. 8, 2013, 5 pgs.
Adamiuk G et al; "Compact, Dual-Polarized UWB-Antanna, Embedded in a Dielectric" IEEE Transactions on Antenna and Propagation, IEEE Service Center, Piscataway, NJ, US vol. 56, No. 2, ISSN: 0018-926X, abstract; Figure 1, Feb. 1, 2010, 8 pgs.
Mascarenas et al.; "Experimental Studies of Using Wireless Energy Transmission for Powering Embedded Sensor Nodes." Nov. 28, 2009, Journal of Sound and Vibration, pp. 2421-2433.
European Search Report . EP15876036, dated May. 3, 2018, 8 pgs.
Energous Corp., ISRWO, PCT/US2018/012806, dated Mar. 23, 2018, 9 pgs.
Energous Corp., ISRWO, PCT/US2017/046800, dated Sep. 11, 2017, 13 pgs.
Energous Corp., ISRWO, PCT/US2017/065886, dated Apr. 6, 2018, 13 pgs.
Order Granting Reexamination Request Control No. 90013793 dated Aug. 31, 2016, 23 pgs.
*Ossia Inc.* vs *Energous Corp.*, PGR2016-00023-Institution Decision, dated Nov. 29, 2016, 29 pgs.
*Ossia Inc.* vs *Energous Corp.*,PGR2016-00024-Institution Decision, Nov. 29, 2016, 50 pgs.
*Ossia Inc.* vs *Energous Corp.*,PGR2016-00024-Judgement-Adverse, Jan. 20, 2017, 3 pgs.
ReExam Ordered Control No. 90013793 Feb. 2, 2017, 8 pgs.
*Ossia Inc.* vs *Energous Corp.*,Declaration of Stephen B. Heppe in Support of Petition for Post-Grant Review of U.S. Pat. No. 9124125, PGR2016-00024, May 31, 2016, 122 pgs.
*Ossia Inc.* vs *Energous Corp.*,Petition for Post-Grant Review of U.S. Pat. No. 9124125, May 31, 2016, 92 pgs.
*Ossia Inc.* vs *Energous Corp.*,Patent Owner Preliminary Response, Sep. 8, 2016, 95 pgs.
*Ossia Inc.* vs *Energous Corp.*, Petition for Post Grant Review of U.S. Pat. No. 9124125, May 31, 2016, 86 pgs.
*Ossia Inc.* vs *Energous Corp.*, Declaration of Stephen B. Heppe in Support of Petition for Post-Grant Review of U.S. Pat. No. 9124125, PGR2016-00023, May 31, 2016, 144 pgs.
Li et al. High-Efficiency Switching-Mode Charger System Design Conisderations with Dynamnic Power Path Management, Mar./Apr. 2012 Issue, 8 pgs.

\* cited by examiner

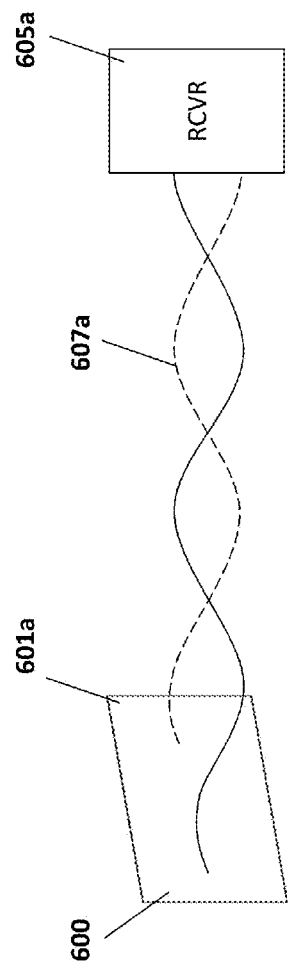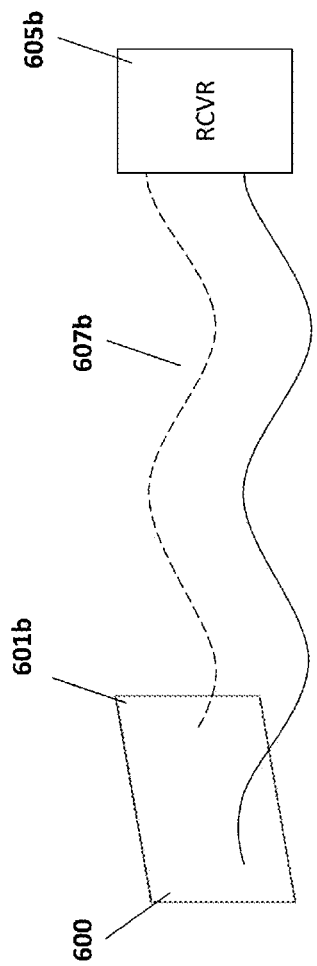
FIG. 6A
FIG. 6B

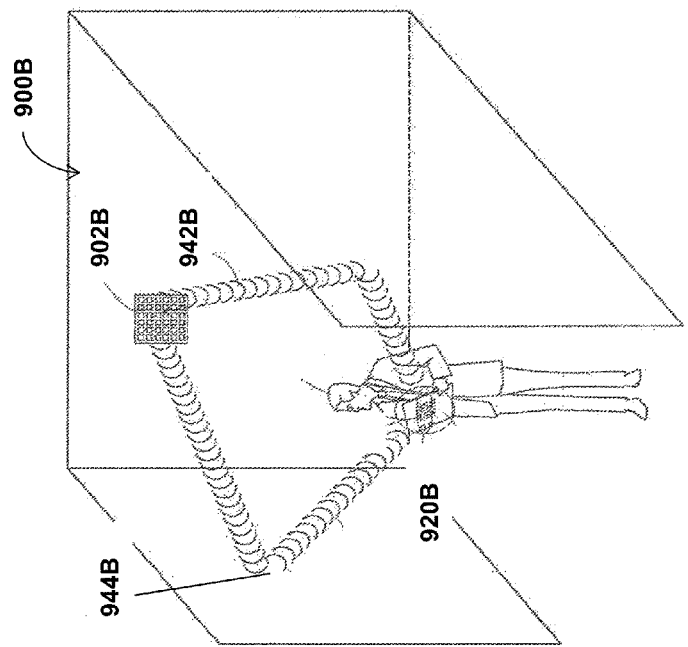
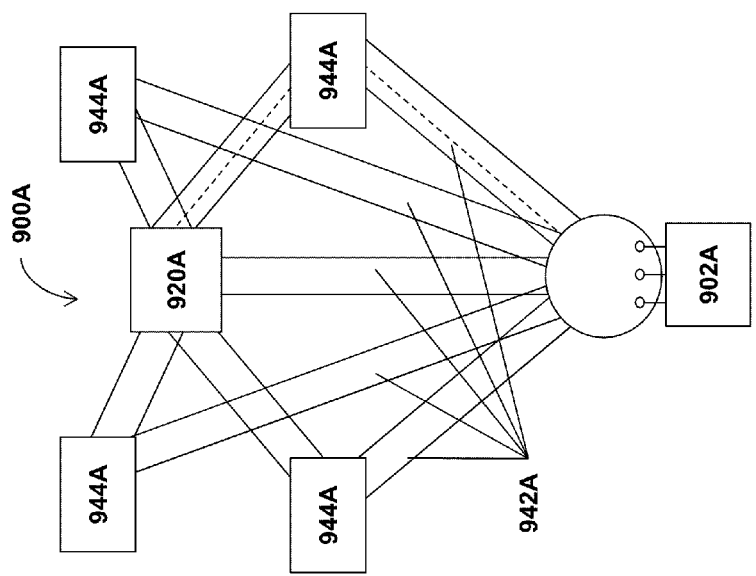
FIG. 9B
FIG. 9A

SYSTEMS AND METHODS FOR USING APPLICATION PROGRAMMING INTERFACES TO CONTROL COMMUNICATIONS BETWEEN A TRANSMITTER AND A RECEIVER

CROSS-REFERENCE TO RELATED APPLICATIONS

This application is a continuation-in-part of U.S. Non-Provisional patent application Ser. No. 14/272,039, filed May 7, 2014, entitled "Systems and Methods For Wireless Transmission of Power;" which is herein fully incorporated by reference in its entirety.

This application relates to U.S. Non-Provisional patent application Ser. No. 13/891,430, filed May 10, 2013, entitled "Methodology For Pocket-forming;" U.S. Non-Provisional patent application Ser. No. 13/925,469, filed Jun. 24, 2013, entitled "Methodology for Multiple Pocket-Forming;" U.S. Non-Provisional patent application Ser. No. 13/946,082, filed Jul. 19, 2013, entitled "Method for 3 Dimensional Pocket-forming;" U.S. Non-Provisional patent application Ser. No. 13/891,399, filed May 10, 2013, entitled "Receivers for Wireless Power Transmission;" U.S. Non-Provisional patent application Ser. No. 13/891,445, filed May 10, 2013, entitled "Transmitters for Wireless Power Transmission;" U.S. Non-Provisional patent application Ser. No. 14/272,066, filed May 7, 2014, entitled "Systems and Methods for Managing and Controlling a Wireless Power Network;" U.S. Non-Provisional patent application Ser. No. 14/583,625, filed Dec. 27, 2014, entitled "Receivers for Wireless Power Transmission," U.S. Non-Provisional patent application Ser. No. 14/583,630, filed Dec. 27, 2014, entitled "Methodology for Pocket-Forming," U.S. Non-Provisional patent application Ser. No. 14/583,634, filed Dec. 27, 2014, entitled "Transmitters for Wireless Power Transmission," U.S. Non-Provisional patent application Ser. No. 14/583,640, filed Dec. 27, 2014, entitled "Methodology for Multiple Pocket-Forming," U.S. Non-Provisional patent application Ser. No. 14/583,641, filed Dec. 27, 2014, entitled "Wireless Power Transmission with Selective Range," U.S. Non-Provisional patent application Ser. No. 14/583,643, filed Dec. 27, 2014, entitled "Method for 3 Dimensional Pocket-Forming," all of which are incorporated herein by reference in their entirety.

TECHNICAL FIELD

The present disclosure relates generally to wireless power transmission.

BACKGROUND

Portable electronic devices such as smart phones, tablets, notebooks and other electronic devices have become an everyday need in the way we communicate and interact with others. The frequent use of these devices may require a significant amount of power, which may easily deplete the batteries attached to these devices. Therefore, a user is frequently needed to plug in the device to a power source, and recharge such device. This may require having to charge electronic equipment at least once a day, or in high-demand electronic devices more than once a day.

Such an activity may be tedious and may represent a burden to users. For example, a user may be required to carry chargers in case his electronic equipment is lacking power. In addition, users have to find available power sources to connect to. Lastly, users must plugin to a wall or other power supply to be able to charge his or her electronic device. However, such an activity may render electronic devices inoperable during charging.

Current solutions to this problem may include devices having rechargeable batteries. However, the aforementioned approach requires a user to carry around extra batteries, and also make sure that the extra set of batteries is charged. Solar-powered battery chargers are also known, however, solar cells are expensive, and a large array of solar cells may be required to charge a battery of any significant capacity. Other approaches involve a mat or pad that allows charging of a device without physically connecting a plug of the device to an electrical outlet, by using electromagnetic signals. In this case, the device still requires to be placed in a certain location for a period of time in order to be charged. Assuming a single source power transmission of electromagnetic (EM) signal, an EM signal gets reduced by a factor proportional to 1/r2 in magnitude over a distance r, in other words, it is attenuated proportional to the square of the distance. Thus, the received power at a large distance from the EM transmitter is a small fraction of the power transmitted. To increase the power of the received signal, the transmission power would have to be boosted. Assuming that the transmitted signal has an efficient reception at three centimeters from the EM transmitter, receiving the same signal power over a useful distance of three meters would entail boosting the transmitted power by 10,000 times. Such power transmission is wasteful, as most of the energy would be transmitted and not received by the intended devices, it could be hazardous to living tissue, it would most likely interfere with most electronic devices in the immediate vicinity, and it may be dissipated as heat.

In yet another approach such as directional power transmission, it would generally require knowing the location of the device to be able to point the signal in the right direction to enhance the power transmission efficiency. However, even when the device is located, efficient transmission is not guaranteed due to reflections and interference of objects in the path or vicinity of the receiving device.

Although the use of wireless power transmission may significantly solve the problem of using wires or pads for charging devices, the communication controls among wireless power devices using this approach may demand a real time communication (high transfer rate) and may not be easily achieved. There are a few off-the-shelf solutions that allow the fast communication between these devices, however these solutions may encounter a limited number of packets sent per second, hence a real time communication may not be reached. For the foregoing reasons, there is a need for a system and method that allows real time communication among wireless power devices so as to have a better control of them.

SUMMARY

The embodiments described herein include a transmitter that transmits a power transmission signal (e.g., radio frequency (RF) signal waves) to create a three-dimensional pocket of energy. At least one receiver can be connected to or integrated into electronic devices and receive power from the pocket of energy. The transmitter can locate the at least one receiver in a three-dimensional space using a communication medium (e.g., Bluetooth technology). The transmitter generates a waveform to create a pocket of energy around each of the at least one receiver. The transmitter uses an algorithm to direct, focus, and control the waveform in three dimensions. The receiver can convert the transmission signals (e.g., RF signals) into electricity for powering an electronic device. Accordingly, the embodiments for wireless power transmission can allow powering and charging a plurality of electrical devices without wires.

A wireless power network may include wireless power transmitters each with an embedded wireless power transmitter manager. The wireless power transmitter manager may include a wireless power manager application, which may be a software application hosted in a computing device. The wireless power transmitter manager may include a GUI which may be used by a user to perform management tasks.

The wireless power network may include a plurality of client devices with wireless power receivers built in as part of the device or adapted externally. Wireless power receivers may include a power receiver application configured to communicate with the power transmitter manager application in a wireless power transmitter. The wireless power manager application may include a device database where information about the wireless power network may be stored.

In one embodiment, a wireless power network comprises at least one transmitter configured for providing controlled power transmission signals to produce a plurality of pockets of energy configured for receipt by a receiver at least one client device; and at least one power manager configured for controlling at least the at least one transmitter, the at least one power manager further comprising at least one database comprising identification and attribute information of the at least one transmitter, the at least one receiver, and the at least one client device; wherein the controlling by the at least one power manager allows the plurality of pockets of energy to charge or power the at least one client device in accordance with the identification and attribute information of the at least one client device.

In another embodiment, a method for providing a wireless power network; comprises transmitting, by a transmitter, controlled power transmission signals to produce a plurality of pockets of energy for receipt at at least one client device; and controlling, by the transmitter, the transmitting of the controlled power transmission signals to produce the plurality of pockets of energy by at least one power manager; wherein the controlling allows ones of the plurality of pockets of energy to charge or power the at least one client device in accordance with identification and attribute information of the at least one client device.

In another embodiment, a wireless power network comprises at least one receiver at a client device configured for receiving from a transmitter controlled power transmission signals that produce a plurality of pockets of energy; and at least one power manager configured for controlling at least the at least one receiver, the at least one power manager further comprising at least one database comprising identification and attribute information of the transmitter, the at least one receiver, and the at least one client device; wherein the controlling by the at least one power manager allows ones of the plurality of pockets of energy to charge or power the at least one client device in accordance with the identification and attribute information of the at least one client device.

In yet another embodiment, a system for controlling communication between a wireless power transmitter and at least one wireless power receiver, the system comprises a wireless power transmitter that includes: a microprocessor configured to run a power transmitter manager application; wireless communication hardware having an application programming interface (API) operatively coupled with the power transmitter manager application; a transmitter power transmission signal antenna array controlled by transmitter antenna manager software running on the microprocessor, configured to form controlled power transmission signals that converge to create pockets of energy in the space proximate the wireless power transmitter at least partially responsive to the transmitter antenna manager software; and at least one wireless power receiver that includes a microprocessor configured to run a power receiver application; wireless communication hardware having a receiver operatively coupled to the power receiver application; and a receiver antenna array configured to receive and use power from the pockets of energy created by the wireless power transmitter at least partially responsive to the power receiver application.

In a further embodiment, a wireless power transmitter comprises a microprocessor configured to run a power transmitter manager application; wireless communication hardware having an application programming interface (API) operatively coupled with the power transmitter manager application; and a transmitter power transmission signal antenna array controlled by transmitter antenna manager software running on the transmitter microprocessor, configured to form controlled RF waves that converge to create pockets of energy in the area proximate the wireless power transmitter responsive to the power transmitter application, which is responsive to the API.

In another embodiment, a wireless power receiver comprises a microprocessor running a power receiver application; wireless communication hardware having a receiver operatively coupled to the power receiver application; and a receiver RF antenna array arranged to receive and use RF power from the pockets of energy created by the wireless power transmitter responsive to the power receiver application, which is responsive to the API.

In yet another embodiment, a method of wirelessly transmitting power comprising receiving, by a power transmitter, at least one of ads broadcast by a power receiver, wherein the ads include an identifier of the power receiver; initiating, by the power transmitter, a communication connection with the power receiver; receiving, by the power transmitter, information of the power receiver the information sent by the power receiver; determining, by the power transmitter, whether the power receiver is to be charged; tracking, by the power transmitter, a position of the power receiver, in the case the power receiver is to be charged; and sending, by the power transmitter, a plurality of power transmission signals that interfere constructively at the location of the power receiver to form a pocket of energy at the power receiver's position.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

FIG. 6A illustrates waveforms for wireless power transmission with selective range, which may get unified in single waveform.

FIG. 6B illustrates waveforms for wireless power transmission with selective range, which may get unified in single waveform.

FIGS. 9A and 9B illustrate a diagram of an architecture for wirelessly charging client computing platform, according to an exemplary embodiment

DETAILED DESCRIPTION

Figure 1:
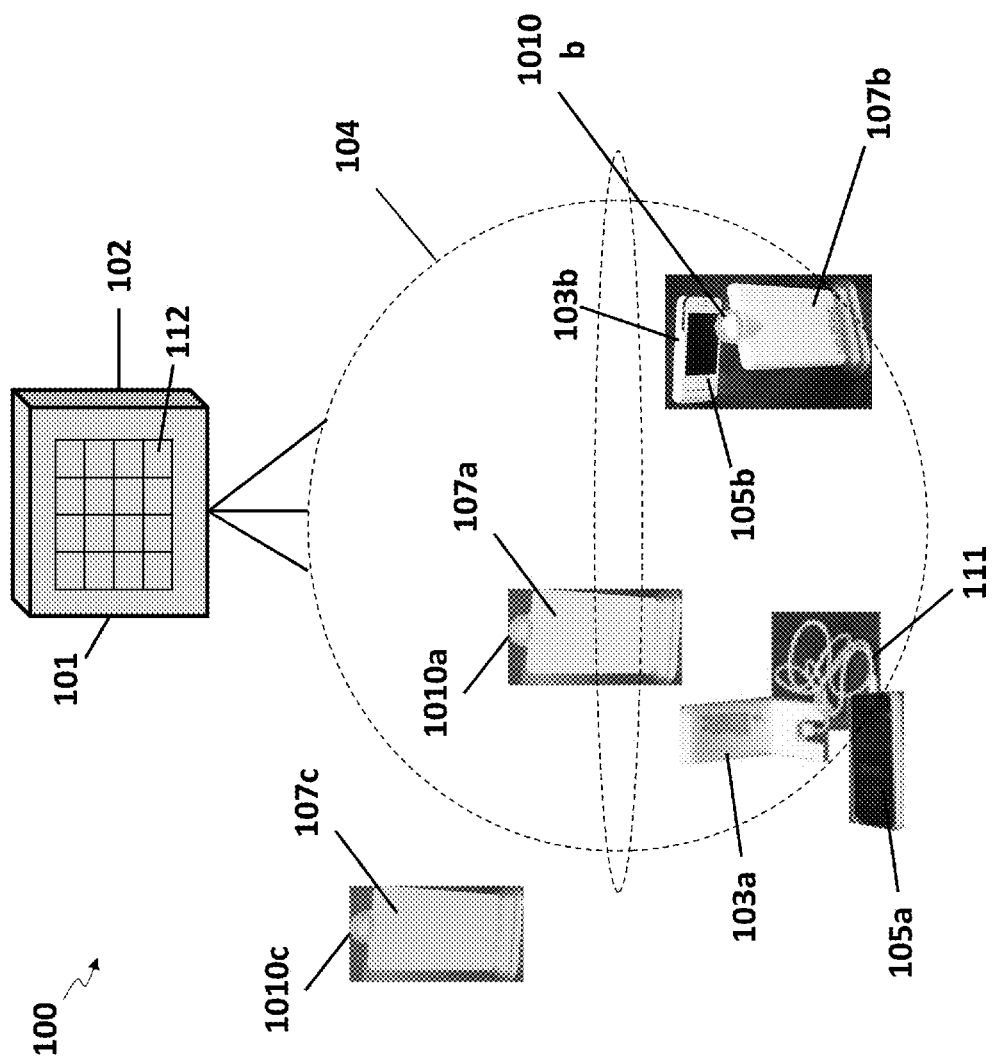
FIG. 1 illustrates a system overview, according to an exemplary embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here. Furthermore, the various components and embodiments described herein may be combined to form additional embodiments not expressly described, without departing from the spirit or scope of the invention.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

I. Systems and Methods for Wireless Power Transmissions

A. Components System Embodiment

FIG. 1 shows a system 100 for wireless power transmission by forming pockets of energy 104. The system 100 may comprise transmitters 101, receivers 103, client devices 105, and pocket detectors 107. Transmitters 101 may transmit power transmission signals comprising power transmission waves, which may be captured by receivers 103. The receivers 103 may comprise antennas, antenna elements, and other circuitry (detailed later), which may convert the captured waves into a useable source of electrical energy on behalf of client devices 105 associated with the receivers 103. In some embodiments, transmitters 101 may transmit power transmission signals, made up of power transmission waves, in one or more trajectories by manipulating the phase, gain, and/or other waveform features of the power transmission waves, and/or by selecting different transmit antennas. In such embodiments, the transmitters 101 may manipulate the trajectories of the power transmission signals so that the underlying power transmission waves converge at a location in space, resulting in certain forms of interference. One type of interference generated at the convergence of the power transmission waves, "constructive interference," may be a field of energy caused by the convergence of the power transmission waves such that they add together and strengthen the energy concentrated at that location—in contrast to adding together in a way to subtract from each other and diminish the energy concentrated at that location, which is called "destructive interference". The accumulation of sufficient energy at the constructive interference may establish a field of energy, or "pocket of energy" 104, which may be harvested by the antennas of a receiver 103, provided the antennas are configured to operate on the frequency of the power transmission signals. Accordingly, the power transmission waves establish pockets of energy 104 at the location in space where the receivers 103 may receive, harvest, and convert the power transmission waves into useable electrical energy, which may power or charge associated electrical client devices 105. Detectors 107 may be devices comprising a receiver 103 that are capable of producing a notification or alert in response to receiving power transmission signals. As an example, a user searching for the optimal placement of a receiver 103 to charge the user's client device 105 may use a detector 107 that comprises an LED light 108, which may brighten when the detector 107 captures the power transmission signals from a single beam or a pocket of energy 104.

1. Transmitters

The transmitter 101 may transmit or broadcast power transmission signals to a receiver 103 associated with a device 105. Although several of the embodiments mentioned below describe the power transmission signals as radio frequency (RF) waves, it should be appreciated that the power transmission may be physical media that is capable of being propagated through space, and that is capable of being converted into a source of electrical energy 103. The transmitter 101 may transmit the power transmission signals as a single beam directed at the receivers 103. In some cases, one or more transmitters 101 may transmit a plurality of power transmission signals that are propagated in a multiple directions and may deflect off of physical obstructions (e.g., walls). The plurality of power transmission signals may converge at a location in a three-dimensional space, forming a pocket of energy 104. Receivers 103 within the boundaries of an energy pocket 104 may capture and covert the power transmission signals into a useable source of energy. The transmitter 101 may control pocket-forming based on phase and/or relative amplitude adjustments of power transmission signals, to form constructive interference patterns.

Although the exemplary embodiment recites the use of RF wave transmission techniques, the wireless charging techniques should not be limited to RF wave transmission techniques. Rather, it should be appreciated that possible wireless charging techniques may include any number of alternative or additional techniques for transmitting energy to a receiver converting the transmitted energy to electrical power. Non-limiting exemplary transmission techniques for energy that can be converted by a receiving device into electrical power may include: ultrasound, microwave, resonant and inductive magnetic fields, laser light, infrared, or other forms of electromagnetic energy. In the case of ultrasound, for example, one or more transducer elements may be disposed so as to form a transducer array that transmits ultrasound waves toward a receiving device that receives the ultrasound waves and converts them to electrical power. In the case of resonant or inductive magnetic fields, magnetic fields are created in a transmitter coil and converted by a receiver coil into electrical power. In addition, although the exemplary transmitter 101 is shown as a single unit comprising potentially multiple transmitters (transmit array), both for RF transmission of power and for other power transmission methods mentioned in this paragraph, the transmit arrays can comprise multiple transmitters that are physically spread around a room rather than being in a compact regular structure. The transmitter includes an antenna array where the antennas are used for sending the power transmission signal. Each antenna sends power transmission waves where the transmitter applies a different phase and amplitude to the signal transmitted from different antennas. Similar to the formation of pockets of energy, the transmitter can form a phased array of delayed versions of the signal to be transmitted, then applies different amplitudes to the delayed versions of the signal, and then sends the signals from appropriate antennas. For a sinusoidal waveform, such as an RF signal, ultrasound, microwave, or others, delaying the signal is similar to applying a phase shift to the signal.

2. Pockets of Energy

A pocket of energy 104 may be formed at locations of constructive interference patterns of power transmission signals transmitted by the transmitter 101. The pockets of energy 104 may manifest as a three-dimensional field where energy may be harvested by receivers 103 located within the pocket of energy 104. The pocket of energy 104 produced by transmitters 101 during pocket-forming may be harvested by a receiver 103, converted to an electrical charge, and then provided to electronic client device 105 associated with the receiver 103 (e.g., laptop computer, smartphone, rechargeable battery). In some embodiments, there may be multiple transmitters 101 and/or multiple receivers 103 powering various client devices 105. In some embodiments, adaptive pocket-forming may adjust transmission of the power transmission signals in order to regulate power levels and/or identify movement of the devices 105.

3. Receivers

A receiver 103 may be used for powering or charging an associated client device 105, which may be an electrical device coupled to or integrated with the receiver 103. The receiver 103 may receive power transmission waves from one or more power transmission signals originating from one or more transmitters 101. The receiver 103 may receive the power transmission signals as a single beam produced by the transmitter 101, or the receiver 103 may harvest power transmission waves from a pocket of energy 104, which may be a three-dimensional field in space resulting from the convergence of a plurality of power transmission waves produced by one or more transmitters 101. The receiver 103 may comprise an array of antennas 112 configured to receive power transmission waves from a power transmission signal and harvest the energy from the power transmission signals of the single beam or pocket of energy 104. The receiver 103 may comprise circuitry that then converts the energy of the power transmission signals (e.g., the radio frequency electromagnetic radiation) to electrical energy. A rectifier of the receiver 103 may translate the electrical energy from AC to DC. Other types of conditioning may be applied, as well. For example, a voltage conditioning circuit may increase or decrease the voltage of the electrical energy as required by the client device 105. An electrical relay may then convey the electrical energy from the receiver 103 to the client device 105.

In some embodiments, the receiver 103 may comprise a communications component that transmits control signals to the transmitter 101 in order to exchange data in real-time or near real-time. The control signals may contain status information about the client device 105, the receiver 103, or the power transmission signals. Status information may include, for example, present location information of the device 105, amount of charge received, amount of charged used, and user account information, among other types of information. Further, in some applications, the receiver 103 including the rectifier that it contains may be integrated into the client device 105. For practical purposes, the receiver 103, wire 111, and client device 105 may be a single unit contained in a single packaging.

4. Control Signals

In some embodiments, control signals may serve as data inputs used by the various antenna elements responsible for controlling production of power transmission signals and/or pocket-forming. Control signals may be produced by the receiver 103 or the transmitter 101 using an external power supply (not shown) and a local oscillator chip (not shown), which in some cases may include using a piezoelectric material. Control signals may be RF waves or any other communication medium or protocol capable of communicating data between processors, such as Bluetooth®, RFID, infrared, near-field communication (NFC). As detailed later, control signals may be used to convey information between the transmitter 101 and the receiver 103 used to adjust the power transmission signals, as well as contain information related to status, efficiency, user data, power consumption, billing, geo-location, and other types of information.

5. Detectors

A detector 107 may comprise hardware similar to receivers 103, which may allow the detector 107 to receive power transmission signals originating from one or more transmitters 101. The detector 107 may be used by users to identify the location of pockets of energy 104, so that users may determine the preferable placement of a receiver 103. In some embodiments, the detector 107 may comprise an indicator light 108 that indicates when the detector is placed within the pocket of energy 104. As an example, in FIG. 1, detectors 107a, 107b are located within the pocket of energy 104 generated by the transmitter 101, which may trigger the detectors 107a, 107b to turn on their respective indicator lights 108a, 108b, because the detectors 107a, 107b are receiving power transmission signals of the pocket of energy 104; whereas, the indicator light 108c of a third detector 107c located outside of the pockets of energy 104, is turned off, because the third detector 107c is not receiving the power transmission signals from the transmitter 101. It should be appreciated that the functions of a detector, such as the indicator light, may be integrated into a receiver or into a client device in alternative embodiments as well.

6. Client Device

A client device 105 may be any electrical device that requires continuous electrical energy or that requires power from a battery. Non-limiting examples of client devices 105 may include laptops, mobile phones, smartphones, tablets, music players, toys, batteries, flashlights, lamps, electronic watches, cameras, gaming consoles, appliances, GPS devices, and wearable devices or so-called "wearables" (e.g., fitness bracelets, pedometers, smartwatch), among other types of electrical devices.

In some embodiments, the client device 105a may be a physical device distinct from the receiver 103a associated with the client device 105a. In such embodiments, the client device 105a may be connected to the receiver over a wire 111 that conveys converted electrical energy from the receiver 103a to the client device 105a. In some cases, other types of data may be transported over the wire 111, such as power consumption status, power usage metrics, device identifiers, and other types of data.

In some embodiments, the client device 105b may be permanently integrated or detachably coupled to the receiver 103b, thereby forming a single integrated product or unit. As an example, the client device 105b may be placed into a sleeve that has embedded receivers 103b and that may detachably couple to the device's 105b power supply input, which may be typically used to charge the device's 105b battery. In this example, the device 105b may be decoupled from the receiver, but may remain in the sleeve regardless of whether or not the device 105b requires an electrical charge or is being used. In another example, in lieu of having a battery that holds a charge for the device 105b, the device 105b may comprise an integrated receiver 105b, which may be permanently integrated into the device 105b so as to form an indistinct product, device, or unit. In this example, the device 105b may rely almost entirely on the integrated receiver 103b to produce electrical energy by harvesting pockets of energy 104. It should be clear to someone skilled in the art that the connection between the receiver 103 and the client device 105 may be a wire 111 or may be an electrical connection on a circuit board or an integrated circuit, or even a wireless connection, such as inductive or magnetic.

B. Method of Wireless Power Transmission

Figure 2:
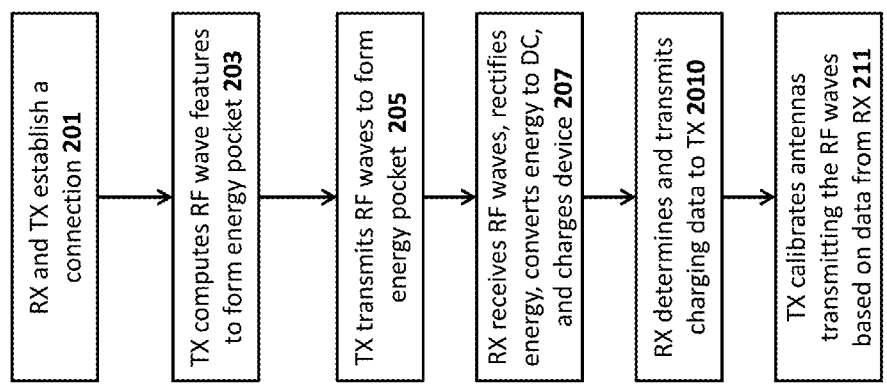
FIG. 2 illustrates steps of wireless power transmission, according to an exemplary embodiment.

FIG. 2 shows steps of wireless power transmission, according to an exemplary method 200 embodiment.

In a first step 201, a transmitter (TX) establishes a connection or otherwise associates with a receiver (RX). That is, in some embodiments, transmitters and receivers may communicate control data over using a wireless communication protocol capable of transmitting information between two processors of electrical devices (e.g., Bluetooth®, Bluetooth Low Energy (BLE), Wi-Fi, NFC, ZigBee®). For example, in embodiments implementing Bluetooth® or Bluetooth® variants, the transmitter may scan for receiver's broadcasting advertisement signals or a receiver may transmit an advertisement signal to the transmitter. The advertisement signal may announce the receiver's presence to the transmitter, and may trigger an association between the transmitter and the receiver. As described herein, in some embodiments, the advertisement signal may communicate information that may be used by various devices (e.g., transmitters, client devices, sever computers, other receivers) to execute and manage pocket-forming procedures. Information contained within the advertisement signal may include a device identifier (e.g., MAC address, IP address, UUID), the voltage of electrical energy received, client device power consumption, and other types of data related to power transmission. The transmitter may use the advertisement signal transmitted to identify the receiver and, in some cases, locate the receiver in a two-dimensional space or in a three-dimensional space. Once the transmitter identifies the receiver, the transmitter may establish the connection associated in the transmitter with the receiver, allowing the transmitter and receiver to communicate control signals over a second channel.

In a next step 203, the transmitter may use the advertisement signal to determine a set of power transmission signal features for transmitting the power transmission signals, to then establish the pockets of energy. Non-limiting examples of features of power transmission signals may include phase, gain, amplitude, magnitude, and direction among others. The transmitter may use information contained in the receiver's advertisement signal, or in subsequent control signals received from the receiver, to determine how to produce and transmit the power transmission signals so that the receiver may receive the power transmission signals. In some cases, the transmitter may transmit power transmission signals in a way that establishes a pocket of energy, from which the receiver may harvest electrical energy. In some embodiments, the transmitter may comprise a processor executing software modules capable of automatically identifying the power transmission signal features needed to establish a pocket of energy based on information received from the receiver, such as the voltage of the electrical energy harvested by the receiver from the power transmission signals. It should be appreciated that in some embodiments, the functions of the processor and/or the software modules may be implemented in an Application Specific Integrated Circuit (ASIC).

Additionally or alternatively, in some embodiments, the advertisement signal or subsequent signal transmitted by the receiver over a second communications channel may indicate one or more power transmission signals features, which the transmitter may then use to produce and transmit power transmission signals to establish a pocket of energy. For example, in some cases the transmitter may automatically identify the phase and gain necessary for transmitting the power transmission signals based on the location of the device and the type of device or receiver; and, in some cases, the receiver may inform the transmitter the phase and gain for effectively transmitting the power transmission signals.

In a next step 205, after the transmitter determines the appropriate features to use when transmitting the power transmission signals, the transmitter may begin transmitting power transmission signals, over a separate channel from the control signals. Power transmission signals may be transmitted to establish a pocket of energy. The transmitter's antenna elements may transmit the power transmission signals such that the power transmission signals converge in a two-dimensional or three-dimensional space around the receiver. The resulting field around the receiver forms a pocket of energy from which the receiver may harvest electrical energy. One antenna element may be used to transmit power transmission signals to establish two-dimensional energy transmissions; and in some cases, a second or additional antenna element may be used to transmit power transmission signals in order to establish a three-dimensional pocket of energy. In some cases, a plurality of antenna elements may be used to transmit power transmission signals in order to establish the pocket of energy. Moreover, in some cases, the plurality of antennas may include all of the antennas in the transmitter; and, in some cases, the plurality of antennas may include a number of the antennas in the transmitter, but fewer than all of the antennas of the transmitter.

As previously mentioned, the transmitter may produce and transmit power transmission signals, according to a determined set of power transmission signal features, which may be produced and transmitted using an external power source and a local oscillator chip comprising a piezoelectric material. The transmitter may comprise an RFIC that controls production and transmission of the power transmission signals based on information related to power transmission and pocket-forming received from the receiver. This control data may be communicated over a different channel from the power transmission signals, using wireless communications protocols, such as BLE, NFC, or ZigBee®. The RFIC of the transmitter may automatically adjust the phase and/or relative magnitudes of the power transmission signals as needed. Pocket-forming is accomplished by the transmitter transmitting the power transmission signals in a manner that forms constructive interference patterns.

Antenna elements of the transmitter may use concepts of wave interference to determine certain power transmission signals features (e.g., direction of transmission, phase of power transmission signal wave), when transmitting the power transmission signals during pocket-forming. The antenna elements may also use concepts of constructive interference to generate a pocket of energy, but may also utilize concepts of deconstructive interference to generate a transmission null in a particular physical location.

In some embodiments, the transmitter may provide power to a plurality of receivers using pocket-forming, which may require the transmitter to execute a procedure for multiple pocket-forming. A transmitter comprising a plurality of antenna elements may accomplish multiple pocket-forming by automatically computing the phase and gain of power transmission signal waves, for each antenna element of the transmitter tasked with transmitting power transmission signals the respective receivers. The transmitter may compute the phase and gains independently, because multiple wave paths for each power transmission signal may be generated by the transmitter's antenna elements to transmit the power transmission signals to the respective antenna elements of the receiver.

As an example of the computation of phase/gain adjustments for two antenna elements of the transmitter transmitting two signals, say X and Y where Y is 180 degree phase shifted version of X (Y=−X). At a physical location where the cumulative received waveform is X−Y, a receiver receives X−Y=X+X=2X, whereas at a physical location where the cumulative received waveform is X+Y, a receiver receives X+Y=X−X=0.

In a next step 207, the receiver may harvest or otherwise receive electrical energy from power transmission signals of a single beam or a pocket of energy. The receiver may comprise a rectifier and AC/DC converter, which may convert the electrical energy from AC current to DC current, and a rectifier of the receiver may then rectify the electrical energy, resulting in useable electrical energy for a client device associated with the receiver, such as a laptop computer, smartphone, battery, toy, or other electrical device. The receiver may utilize the pocket of energy produced by the transmitter during pocket-forming to charge or otherwise power the electronic device.

In next step 209, the receiver may generate control data containing information indicating the effectiveness of the single beam or energy pockets providing the receiver power transmission signals. The receiver may then transmit control signals containing the control data, to the transmitter. The control signals may be transmitted intermittently, depending on whether the transmitter and receiver are communicating synchronously (i.e., the transmitter is expecting to receive control data from the receiver). Additionally, the transmitter may continuously transmit the power transmission signals to the receiver, irrespective of whether the transmitter and receiver are communicating control signals. The control data may contain information related to transmitting power transmission signals and/or establishing effective pockets of energy. Some of the information in the control data may inform the transmitter how to effectively produce and transmit, and in some cases adjust, the features of the power transmission signals. Control signals may be transmitted and received over a second channel, independent from the power transmission signals, using a wireless protocol capable of transmitting control data related to power transmission signals and/or pocket-forming, such as BLE, NFC, Wi-Fi, or the like.

As mentioned, the control data may contain information indicating the effectiveness of the power transmission signals of the single beam or establishing the pocket of energy. The control data may be generated by a processor of the receiver monitoring various aspects of receiver and/or the client device associated with the receiver. The control data may be based on various types of information, such as the voltage of electrical energy received from the power transmission signals, the quality of the power transmission signals reception, the quality of the battery charge or quality of the power reception, and location or motion of the receiver, among other types of information useful for adjusting the power transmission signals and/or pocket-forming.

In some embodiments, a receiver may determine the amount of power being received from power transmission signals transmitted from the transmitter and may then indicate that the transmitter should "split" or segment the power transmission signals into less-powerful power transmission signals. The less-powerful power transmission signals may be bounced off objects or walls nearby the device, thereby reducing the amount of power being transmitted directly from the transmitter to the receiver.

In a next step 211, the transmitter may calibrate the antennas transmitting the power transmission signals, so that the antennas transmit power transmission signals having a more effective set of feature (e.g., direction, phase, gain, amplitude). In some embodiments, a processor of the transmitter may automatically determine more effective features for producing and transmitting the power transmission signals based on a control signal received from the receiver. The control signal may contain control data, and may be transmitted by the receiver using any number of wireless communication protocols (e.g., BLE, Wi-Fi, ZigBee®). The control data may contain information expressly indicating the more effective features for the power transmission waves; or the transmitter may automatically determine the more effective features based on the waveform features of the control signal (e.g., shape, frequency, amplitude). The transmitter may then automatically reconfigure the antennas to transmit recalibrated power transmission signals according to the newly determined more-effective features. For example, the processor of the transmitter may adjust gain and/or phase of the power transmission signals, among other features of power transmission feature, to adjust for a change in location of the receiver, after a user moved the receiver outside of the three-dimensional space where the pocket of energy is established.

C. System Architecture of Power Transmission System

Figure 3:
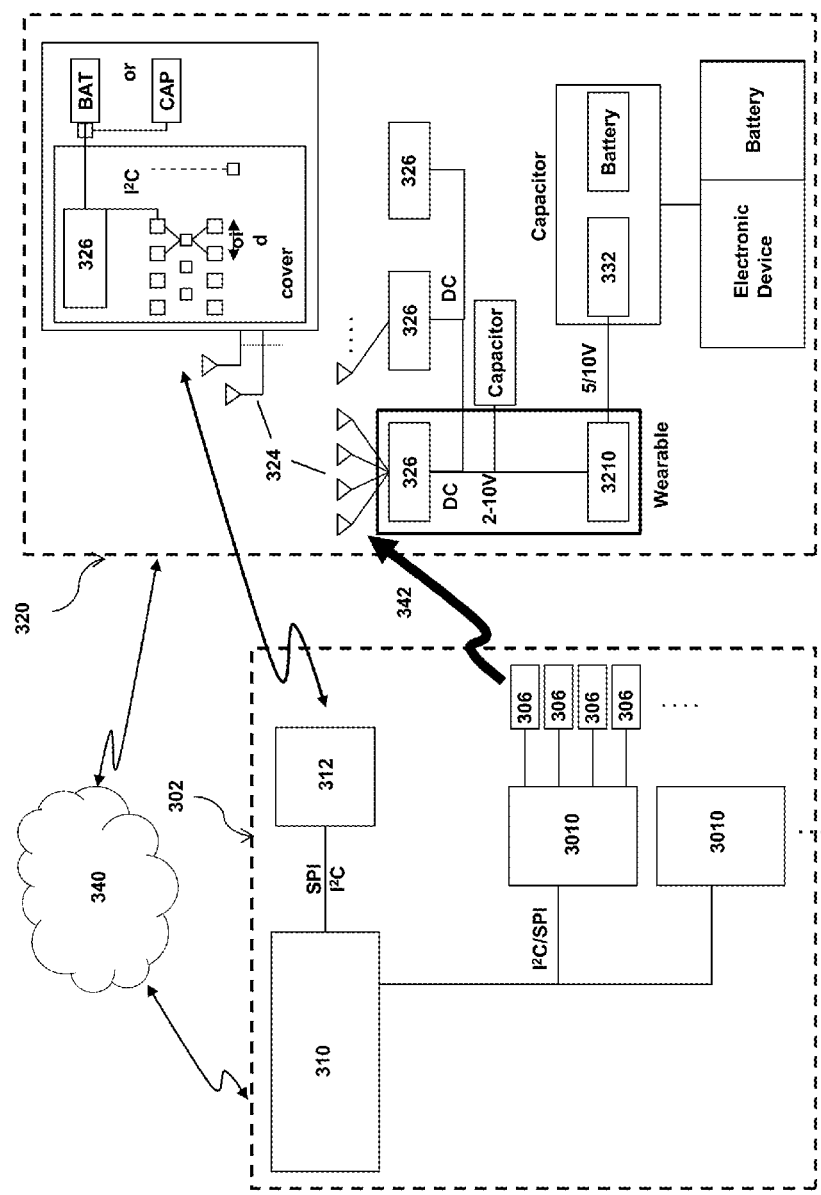
FIG. 3 illustrates an architecture for wireless power transmission, according to an exemplary embodiment.

FIG. 3 illustrates an architecture 300 for wireless power transmission using pocket-forming, according to an exemplary embodiment. "Pocket-forming" may refer to generating two or more power transmission waves 342 that converge at a location in three-dimensional space, resulting in constructive interference patterns at that location. A transmitter 302 may transmit and/or broadcast controlled power transmission waves 342 (e.g., microwaves, radio waves, ultrasound waves) that may converge in three-dimensional space. These power transmission waves 342 may be controlled through phase and/or relative amplitude adjustments to form constructive interference patterns (pocket-forming) in locations where a pocket of energy is intended. It should be understood also that the transmitter can use the same principles to create destructive interference in a location thereby creating a transmission null—a location where transmitted power transmission waves cancel each other out substantially and no significant energy can be collected by a receiver. In typical use cases the aiming of a power transmission signal at the location of the receiver is the objective; and in other cases it may be desirable to specifically avoid power transmission to a particular location; and in other cases it may be desirable to aim power transmission signal at a location while specifically avoiding transmission to a second location at the same time. The transmitter takes the use case into account when calibrating antennas for power transmission.

Antenna elements 306 of the transmitter 302 may operate in single array, pair array, quad array, or any other suitable arrangement that may be designed in accordance with the desired application. Pockets of energy may be formed at constructive interference patterns where the power transmission waves 342 accumulate to form a three-dimensional field of energy, around which one or more corresponding transmission null in a particular physical location may be generated by destructive interference patterns. Transmission null in a particular physical location-may refer to areas or regions of space where pockets of energy do not form because of destructive interference patterns of power transmission waves 342.

A receiver 320 may then utilize power transmission waves 342 emitted by the transmitter 302 to establish a pocket of energy, for charging or powering an electronic device 313, thus effectively providing wireless power transmission. Pockets of energy may refer to areas or regions of space where energy or power may accumulate in the form of constructive interference patterns of power transmission waves 342. In other situations there can be multiple transmitters 302 and/or multiple receivers 320 for powering various electronic equipment for example smartphones, tablets, music players, toys and others at the same time. In other embodiments, adaptive pocket-forming may be used to regulate power on electronic devices. Adaptive pocket-forming may refer to dynamically adjusting pocket-forming to regulate power on one or more targeted receivers.

Receiver 320 may communicate with transmitter 302 by generating a short signal through antenna elements 324 in order to indicate its position with respect to the transmitter 302. In some embodiments, receiver 320 may additionally utilize a network interface card (not shown) or similar computer networking component to communicate through a network 340 with other devices or components of the system 300, such as a cloud computing service that manages several collections of transmitters 302. The receiver 320 may comprise circuitry 308 for converting the power transmission signals 342 captured by the antenna elements 324, into electrical energy that may be provided to and electric device 313 and/or a battery of the device 315. In some embodiments, the circuitry may provide electrical energy to a battery of receiver 335, which may store energy without the electrical device 313 being communicatively coupled to the receiver 320.

Communications components 324 may enable receiver 320 to communicate with the transmitter 302 by transmitting control signals 345 over a wireless protocol. The wireless protocol can be a proprietary protocol or use a conventional wireless protocol, such as Bluetooth®, BLE, Wi-Fi, NFC, ZigBee, and the like. Communications component 324 may then be used to transfer information, such as an identifier for the electronic device 313, as well as battery level information, geographic location data, or other information that may be of use for transmitter 302 in determining when to send power to receiver 320, as well as the location to deliver power transmission waves 342 creating pockets of energy. In other embodiments, adaptive pocket-forming may be used to regulate power provided to electronic devices 313. In such embodiments, the communications components 324 of the receiver may transmit voltage data indicating the amount of power received at the receiver 320, and/or the amount of voltage provided to an electronic device 313b or battery 315.

Once transmitter 302 identifies and locates receiver 320, a channel or path for the control signals 345 can be established, through which the transmitter 302 may know the gain and phases of the control signals 345 coming from receiver 320. Antenna elements 306 of the transmitter 302 may start to transmit or broadcast controlled power transmission waves 342 (e.g., radio frequency waves, ultrasound waves), which may converge in three-dimensional space by using at least two antenna elements 306 to manipulate the power transmission waves 342 emitted from the respective antenna element 306. These power transmission waves 342 may be produced by using an external power source and a local oscillator chip using a suitable piezoelectric material. The power transmission waves 342 may be controlled by transmitter circuitry 301, which may include a proprietary chip for adjusting phase and/or relative magnitudes of power transmission waves 342. The phase, gain, amplitude, and other waveform features of the power transmission waves 342 may serve as inputs for antenna element 306 to form constructive and destructive interference patterns (pocket-forming). In some implementations, a micro-controller 310 or other circuit of the transmitter 302 may produce a power transmission signal, which comprises power transmission waves 342, and that may be may split into multiple outputs by transmitter circuitry 301, depending on the number of antenna elements 306 connected to the transmitter circuitry 301. For example, if four antenna elements 306a-d are connected to one transmitter circuit 301a, the power transmission signal will be split into four different outputs each output going to an antenna element 306 to be transmitted as power transmission waves 342 originating from the respective antenna elements 306.

Pocket-forming may take advantage of interference to change the directionality of the antenna element 306 where constructive interference generates a pocket of energy and destructive interference generates a transmission null. Receiver 320 may then utilize pocket of energy produced by pocket-forming for charging or powering an electronic device and therefore effectively providing wireless power transmission.

Multiple pocket-forming may be achieved by computing the phase and gain from each antenna 306 of transmitter 302 to each receiver 320.

D. Components of Systems Forming Pockets of Energy

Figure 4:
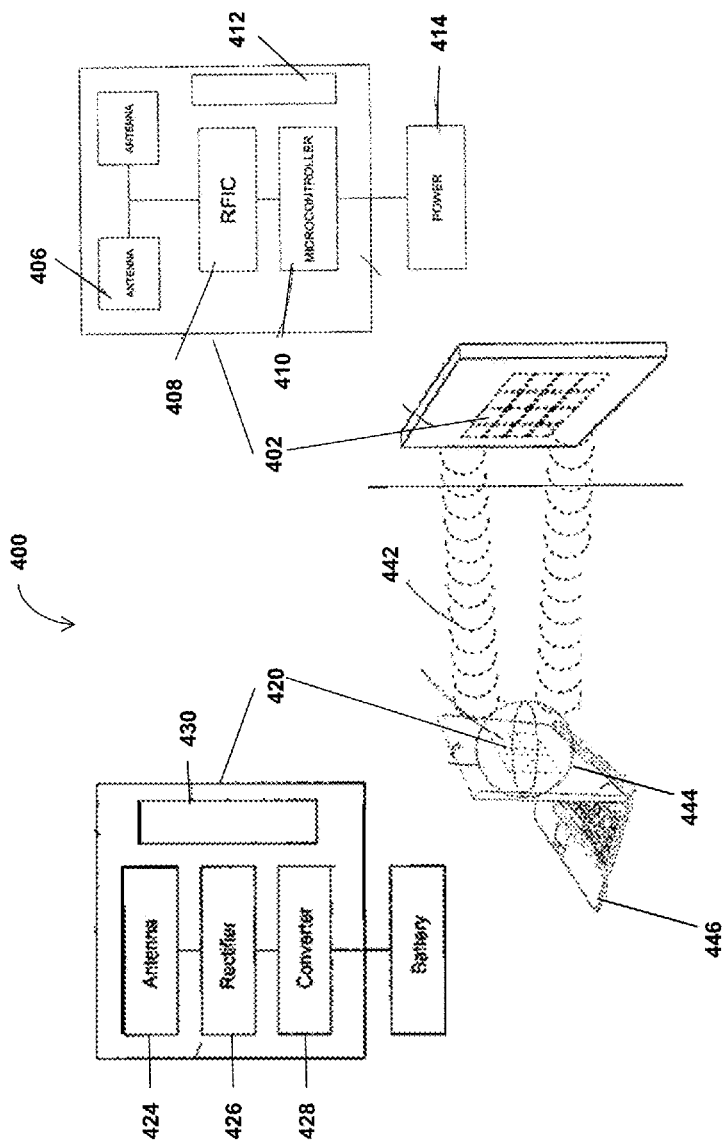
FIG. 4 illustrates components of a system of wireless power transmission using pocket-forming procedures, according to an exemplary embodiment.

FIG. 4 shows components of an exemplary system 400 of wireless power transmission using pocket-forming procedures. The system 400 may comprise one or more transmitters 402, one or more receivers 420, and one or more client devices 446.

1. Transmitters

Transmitters 402 may be any device capable of broadcasting wireless power transmission signals, which may be RF waves 442, for wireless power transmission, as described herein. Transmitters 402 may be responsible for performing tasks related to transmitting power transmission signals, which may include pocket-forming, adaptive pocket-forming, and multiple pocket-forming. In some implementations, transmitters 402 may transmit wireless power transmissions to receivers 420 in the form of RF waves, which may include any radio signal having any frequency or wavelength. A transmitter 402 may include one or more antenna elements 406, one or more RFICs 408, one or more microcontrollers 410, one or more communication components 412, a power source 414, and a housing that may allocate all the requested components for the transmitter 402. The various components of transmitters 402 may comprise, and/or may be manufactured using, meta-materials, micro-printing of circuits, nano-materials, and the like.

In the exemplary system 400, the transmitter 402 may transmit or otherwise broadcast controlled RF waves 442 that converge at a location in three-dimensional space, thereby forming a pocket of energy 444. These RF waves may be controlled through phase and/or relative amplitude adjustments to form constructive or destructive interference patterns (i.e., pocket-forming). Pockets of energy 444 may be fields formed at constructive interference patterns and may be three-dimensional in shape; whereas transmission null in a particular physical location may be generated at destructive interference patterns. Receivers 420 may harvest electrical energy from the pockets of energy 444 produced by pocket-forming for charging or powering an electronic client device 446 (e.g., a laptop computer, a cell phone). In some embodiments, the system 400 may comprise multiple transmitters 402 and/or multiple receivers 420, for powering various electronic equipment. Non-limiting examples of client devices 446 may include: smartphones, tablets, music players, toys and others at the same time. In some embodiments, adaptive pocket-forming may be used to regulate power on electronic devices.

2. Receivers

Receivers 420 may include a housing where at least one antenna element 424, one rectifier 426, one power converter 428, and a communications component 430 may be included.

Housing of the receiver 420 can be made of any material capable of facilitating signal or wave transmission and/or reception, for example plastic or hard rubber. Housing may be an external hardware that may be added to different electronic equipment, for example in the form of cases, or can be embedded within electronic equipment as well.

3. Antenna Elements

Antenna elements 424 of the receiver 420 may comprise any type of antenna capable of transmitting and/or receiving signals in frequency bands used by the transmitter 402A. Antenna elements 424 may include vertical or horizontal polarization, right hand or left hand polarization, elliptical polarization, or other polarizations, as well as any number of polarization combinations. Using multiple polarizations can be beneficial in devices where there may not be a preferred orientation during usage or whose orientation may vary continuously through time, for example a smartphone or portable gaming system. For devices having a well-defined expected orientation (e.g., a two-handed video game controller), there might be a preferred polarization for antennas, which may dictate a ratio for the number of antennas of a given polarization. Types of antennas in antenna elements 424 of the receiver 420, may include patch antennas, which may have heights from about ⅛ inch to about 6 inches and widths from about ⅛ inch to about 6 inches. Patch antennas may preferably have polarization that depends upon connectivity, i.e., the polarization may vary depending on from which side the patch is fed. In some embodiments, the type of antenna may be any type of antenna, such as patch antennas, capable of dynamically varying the antenna polarization to optimize wireless power transmission.

4. Rectifier

Rectifiers 426 of the receiver 420 may include diodes, resistors, inductors, and/or capacitors to rectify alternating current (AC) voltage generated by antenna elements 424 to direct current (DC) voltage. Rectifiers 426 may be placed as close as is technically possible to antenna elements A24B to minimize losses in electrical energy gathered from power transmission signals. After rectifying AC voltage, the resulting DC voltage may be regulated using power converters 428. Power converters 428 can be a DC-to-DC converter that may help provide a constant voltage output, regardless of input, to an electronic device, or as in this exemplary system 400, to a battery. Typical voltage outputs can be from about 5 volts to about 10 volts. In some embodiments, power converter may include electronic switched mode DC-DC converters, which can provide high efficiency. In such embodiments, the receiver 420 may comprise a capacitor (not shown) that is situated to receive the electrical energy before power converters 428. The capacitor may ensure sufficient current is provided to an electronic switching device (e.g., switch mode DC-DC converter), so it may operate effectively. When charging an electronic device, for example a phone or laptop computer, initial high-currents that can exceed the minimum voltage needed to activate operation of an electronic switched mode DC-DC converter, may be required. In such a case, a capacitor (not shown) may be added at the output of receivers 420 to provide the extra energy required. Afterwards, lower power can be provided. For example, ⅛₀ of the total initial power that may be used while having the phone or laptop still build-up charge.

5. Communications Component

A communications component 430 of a receiver 420 may communicate with one or more other devices of the system 400, such as other receivers 420, client devices, and/or transmitters 402. Different antenna, rectifier or power converter arrangements are possible for a receiver as will be explained in following embodiments.

E. Methods of Pocket Forming for a Plurality of Devices

Figure 5:
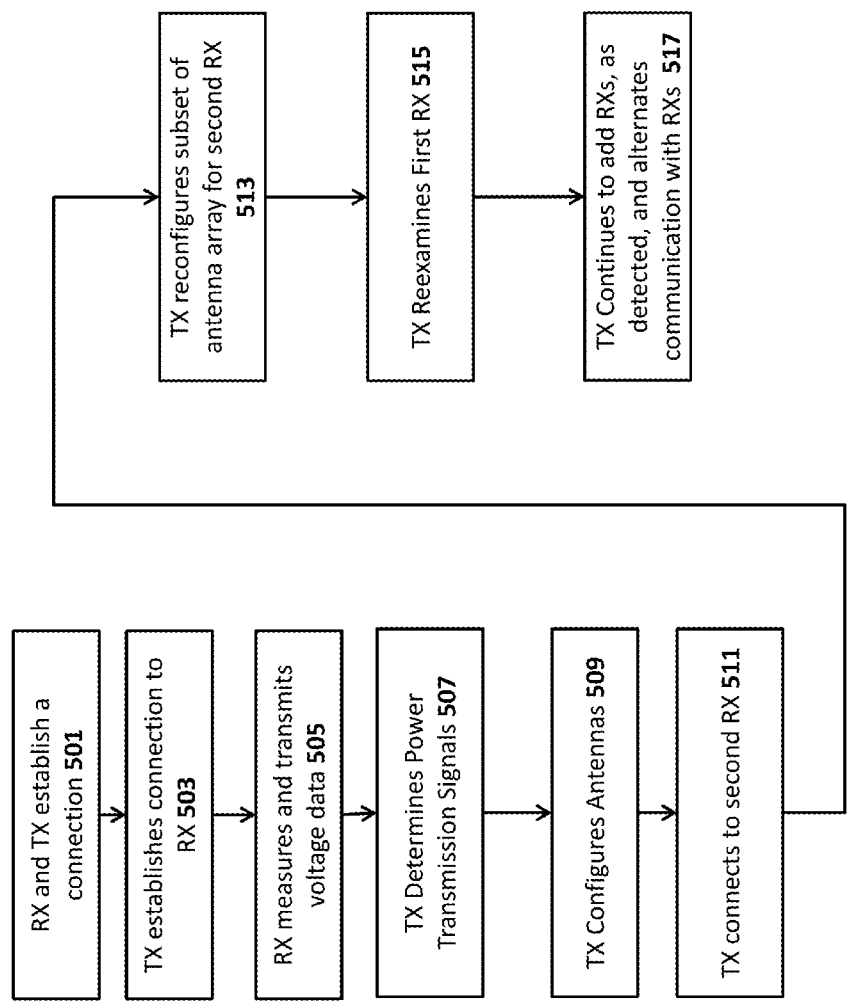
FIG. 5 illustrates steps of powering a plurality of receiver devices, according to an exemplary embodiment.

FIG. 5 shows steps of powering a plurality of receiver devices, according to an exemplary embodiment.

In a first step 501, a transmitter (TX) establishes a connection or otherwise associates with a receiver (RX). That is, in some embodiments, transmitters and receivers may communicate control data over using a wireless communication protocol capable of transmitting information between two processors of electrical devices (e.g., Bluetooth®, BLE, Wi-Fi, NFC, ZigBee®). For example, in embodiments implement Bluetooth® or Bluetooth® variants, the transmitter may scan for receiver's broadcasting advertisement signals or a receiver may transmit an advertisement signal to the transmitter. The advertisement signal may announce the receiver's presence to the transmitter, and may trigger an association between the transmitter and the receiver. As described later, in some embodiments, the advertisement signal may communicate information that may be used by various devices (e.g., transmitters, client devices, sever computers, other receivers) to execute and manage pocket-forming procedures. Information contained within the advertisement signal may include a device identifier (e.g., MAC address, IP address, UUID), the voltage of electrical energy received, client device power consumption, and other types of data related to power transmission waves. The transmitter may use the advertisement signal transmitted to identify the receiver and, in some cases, locate the receiver in a two-dimensional space or in a three-dimensional space. Once the transmitter identifies the receiver, the transmitter may establish the connection associated in the transmitter with the receiver, allowing the transmitter and receiver to communicate control signals over a second channel.

As an example, when a receiver comprising a Bluetooth® processor is powered-up or is brought within a detection range of the transmitter, the Bluetooth processor may begin advertising the receiver according to Bluetooth® standards. The transmitter may recognize the advertisement and begin establishing connection for communicating control signals and power transmission signals. In some embodiments, the advertisement signal may contain unique identifiers so that the transmitter may distinguish that advertisement and ultimately that receiver from all the other Bluetooth® devices nearby within range.

In a next step 503, when the transmitter detects the advertisement signal, the transmitter may automatically form a communication connection with that receiver, which may allow the transmitter and receiver to communicate control signals and power transmission signals. The transmitter may then command that receiver to begin transmitting real-time sample data or control data. The transmitter may also begin transmitting power transmission signals from antennas of the transmitter's antenna array.

In a next step 505, the receiver may then measure the voltage, among other metrics related to effectiveness of the power transmission signals, based on the electrical energy received by the receiver's antennas. The receiver may generate control data containing the measured information, and then transmit control signals containing the control data to the transmitter. For example, the receiver may sample the voltage measurements of received electrical energy, for example, at a rate of 100 times per second. The receiver may transmit the voltage sample measurement back to the transmitter, 100 times a second, in the form of control signals.

In a next step 507, the transmitter may execute one or more software modules monitoring the metrics, such as voltage measurements, received from the receiver. Algorithms may vary production and transmission of power transmission signals by the transmitter's antennas, to maximize the effectiveness of the pockets of energy around the receiver. For example, the transmitter may adjust the phase at which the transmitter's antenna transmit the power transmission signals, until that power received by the receiver indicates an effectively established pocket energy around the receiver. When an optimal configuration for the antennas is identified, memory of the transmitter may store the configurations to keep the transmitter broadcasting at that highest level.

In a next step 509, algorithms of the transmitter may determine when it is necessary to adjust the power transmission signals and may also vary the configuration of the transmit antennas, in response to determining such adjustments are necessary. For example, the transmitter may determine the power received at a receiver is less than maximal, based on the data received from the receiver. The transmitter may then automatically adjust the phase of the power transmission signals, but may also simultaneously continues to receive and monitor the voltage being reported back from receiver.

In a next step 511, after a determined period of time for communicating with a particular receiver, the transmitter may scan and/or automatically detect advertisements from other receivers that may be in range of the transmitter. The transmitters may establish a connection to the second receiver responsive to Bluetooth® advertisements from a second receiver.

In a next step 513, after establishing a second communication connection with the second receiver, the transmitter may proceed to adjust one or more antennas in the transmitter's antenna array. In some embodiments, the transmitter may identify a subset of antennas to service the second receiver, thereby parsing the array into subsets of arrays that are associated with a receiver. In some embodiments, the entire antenna array may service a first receiver for a given period of time, and then the entire array may service the second receiver for that period of time.

Manual or automated processes performed by the transmitter may select a subset of arrays to service the second receiver. In this example, the transmitter's array may be split in half, forming two subsets. As a result, half of the antennas may be configured to transmit power transmission signals to the first receiver, and half of the antennas may be configured for the second receiver. In the current step 513, the transmitter may apply similar techniques discussed above to configure or optimize the subset of antennas for the second receiver. While selecting a subset of an array for transmitting power transmission signals, the transmitter and second receiver may be communicating control data. As a result, by the time that the transmitter alternates back to communicating with the first receiver and/or scan for new receivers, the transmitter has already received a sufficient amount of sample data to adjust the phases of the waves transmitted by second subset of the transmitter's antenna array, to transmit power transmission waves to the second receiver effectively.

In a next step 515, after adjusting the second subset to transmit power transmission signals to the second receiver, the transmitter may alternate back to communicating control data with the first receiver, or scanning for additional receivers. The transmitter may reconfigure the antennas of the first subset, and then alternate between the first and second receivers at a predetermined interval.

In a next step 517, the transmitter may continue to alternate between receivers and scanning for new receivers, at a predetermined interval. As each new receiver is detected, the transmitter may establish a connection and begin transmitting power transmission signals, accordingly.

In one exemplary embodiment, the receiver may be electrically connected to a device like a smart phone. The transmitter's processor would scan for any Bluetooth devices. The receiver may begin advertising that it's a Bluetooth device through the Bluetooth chip. Inside the advertisement, there may be unique identifiers so that the transmitter, when it scanned that advertisement, could distinguish that advertisement and ultimately that receiver from all the other Bluetooth devices nearby within range. When the transmitter detects that advertisement and notices it is a receiver, then the transmitter may immediately form a communication connection with that receiver and command that receiver to begin sending real time sample data.

The receiver would then measure the voltage at its receiving antennas, send that voltage sample measurement back to the transmitter (e.g., 100 times a second). The transmitter may start to vary the configuration of the transmit antennas by adjusting the phase. As the transmitter adjusts the phase, the transmitter monitors the voltage being sent back from the receiver. In some implementations, the higher the voltage, the more energy may be in the pocket. The antenna phases may be altered until the voltage is at the highest level and there is a maximum pocket of energy around the receiver. The transmitter may keep the antennas at the particular phase so the voltage is at the highest level.

The transmitter may vary each individual antenna, one at a time. For example, if there are 32 antennas in the transmitter, and each antenna has 8 phases, the transmitter may begin with the first antenna and would step the first antenna through all 8 phases. The receiver may then send back the power level for each of the 8 phases of the first antenna. The transmitter may then store the highest phase for the first antenna. The transmitter may repeat this process for the second antenna, and step it through 8 phases. The receiver may again send back the power levels from each phase, and the transmitter may store the highest level. Next the transmitter may repeat the process for the third antenna and continue to repeat the process until all 32 antennas have stepped through the 8 phases. At the end of the process, the transmitter may transmit the maximum voltage in the most efficient manner to the receiver.

In another exemplary embodiment, the transmitter may detect a second receiver's advertisement and form a communication connection with the second receiver. When the transmitter forms the communication with the second receiver, the transmitter may aim the original 32 antennas towards the second receiver and repeat the phase process for each of the 32 antennas aimed at the second receiver. Once the process is completed, the second receiver may getting as much power as possible from the transmitter. The transmitter may communicate with the second receiver for a second, and then alternate back to the first receiver for a predetermined period of time (e.g., a second), and the transmitter may continue to alternate back and forth between the first receiver and the second receiver at the predetermined time intervals.

In yet another implementation, the transmitter may detect a second receiver's advertisement and form a communication connection with the second receiver. First, the transmitter may communicate with the first receiver and re-assign half of the exemplary 32 the antennas aimed at the first receiver, dedicating only 16 towards the first receiver. The transmitter may then assign the second half of the antennas to the second receiver, dedicating 16 antennas to the second receiver. The transmitter may adjust the phases for the second half of the antennas. Once the 16 antennas have gone through each of the 8 phases, the second receiver may be obtaining the maximum voltage in the most efficient manner to the receiver.

F. Wireless Power Transmission with Selective Range

1. Constructive Interference

FIG. 6A and FIG. 6B show an exemplary system 600 implementing wireless power transmission principles that may be implemented during exemplary pocket-forming processes. A transmitter 601 comprising a plurality of antennas in an antenna array, may adjust the phase and amplitude, among other possible attributes, of power transmission waves 607, being transmitted from antennas of the transmitter 601. As shown in FIG. 6A, in the absence of any phase or amplitude adjustment, power transmission waves 607*a* may be transmitted from each of the antennas will arrive at different locations and have different phases. These differences are often due to the different distances from each antenna element of the transmitter 601*a* to a receiver 605*a* or receivers 605*a*, located at the respective locations.

Continuing with FIG. 6A, a receiver 605*a* may receive multiple power transmission signals, each comprising power transmission waves 607*a*, from multiple antenna elements of a transmitter 601*a*; the composite of these power transmission signals may be essentially zero, because in this example, the power transmission waves add together destructively. That is, antenna elements of the transmitter 601*a* may transmit the exact same power transmission signal (i.e., comprising power transmission waves 607*a* having the same features, such as phase and amplitude), and as such, when the power transmission waves 607*a* of the respective power transmission signals arrive at the receiver 605*a*, they are offset from each other by 180 degrees. Consequently, the power transmission waves 607*a* of these power transmission signals "cancel" one another. Generally, signals offsetting one another in this way may be referred to as "destructive," and thus result in "destructive interference."

In contrast, as shown in FIG. 6B, for so-called "constructive interference," signals comprising power transmission waves 607*b* that arrive at the receiver exactly "in phase" with one another, combine to increase the amplitude of the each signal, resulting in a composite that is stronger than each of the constituent signals. In the illustrative example in FIG. 6A, note that the phase of the power transmission waves 607*a* in the transmit signals are the same at the location of transmission, and then eventually add up destructively at the location of the receiver 605*a*. In contrast, in FIG. 6B, the phase of the power transmission waves 607*b* of the transmit signals are adjusted at the location of transmission, such that they arrive at the receiver 605*b* in phase alignment, and consequently they add constructively. In this illustrative example, there will be a resulting pocket of energy located around the receiver 605*b* in FIG. 6B; and there will be a transmission null located around receiver in FIG. 6A.

Figure 7:
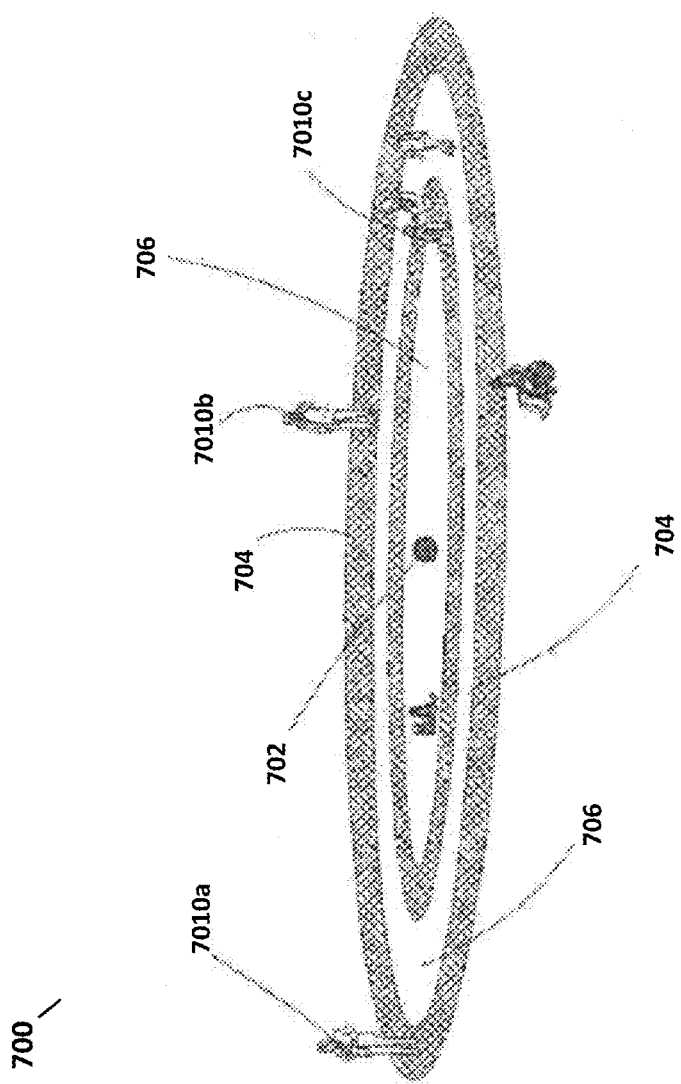
FIG. 7 illustrates wireless power transmission with selective range, where a plurality of pockets of energy may be generated along various radii from transmitter.

FIG. 7 depicts wireless power transmission with selective range 700, where a transmitter 702 may produce pocket-forming for a plurality of receivers associated with electrical devices 701. Transmitter 702 may generate pocket-forming through wireless power transmission with selective range 700, which may include one or more wireless charging radii 704 and one or more radii of a transmission null at a particular physical location 706. A plurality of electronic devices 701 may be charged or powered in wireless charging radii 704. Thus, several spots of energy may be created, such spots may be employed for enabling restrictions for powering and charging electronic devices 701. As an example, the restrictions may include operating specific electronics in a specific or limited spot, contained within wireless charging radii 704. Furthermore, safety restrictions may be implemented by the use of wireless power transmission with selective range 700, such safety restrictions may avoid pockets of energy over areas or zones where energy needs to be avoided, such areas may include areas including sensitive equipment to pockets of energy and/or people which do not want pockets of energy over and/or near them. In embodiments such as the one shown in FIG. 7, the transmitter 702 may comprise antenna elements found on a different plane than the receivers associated with electrical devices 701 in the served area. For example the receivers of electrical devices 701 may be in a room where a transmitter 702 may be mounted on the ceiling. Selective ranges for establishing pockets of energy using power transmission waves, which may be represented as concentric circles by placing an antenna array of the transmitter 702 on the ceiling or other elevated location, and the transmitter 702 may emit power transmission waves that will generate 'cones' of energy pockets. In some embodiments, the transmitter 701 may control the radius of each charging radii 704, thereby establishing intervals for service area to create pockets of energy that are pointed down to an area at a lower plane, which may adjust the width of the cone through appropriate selection of antenna phase and amplitudes.

Figure 8:
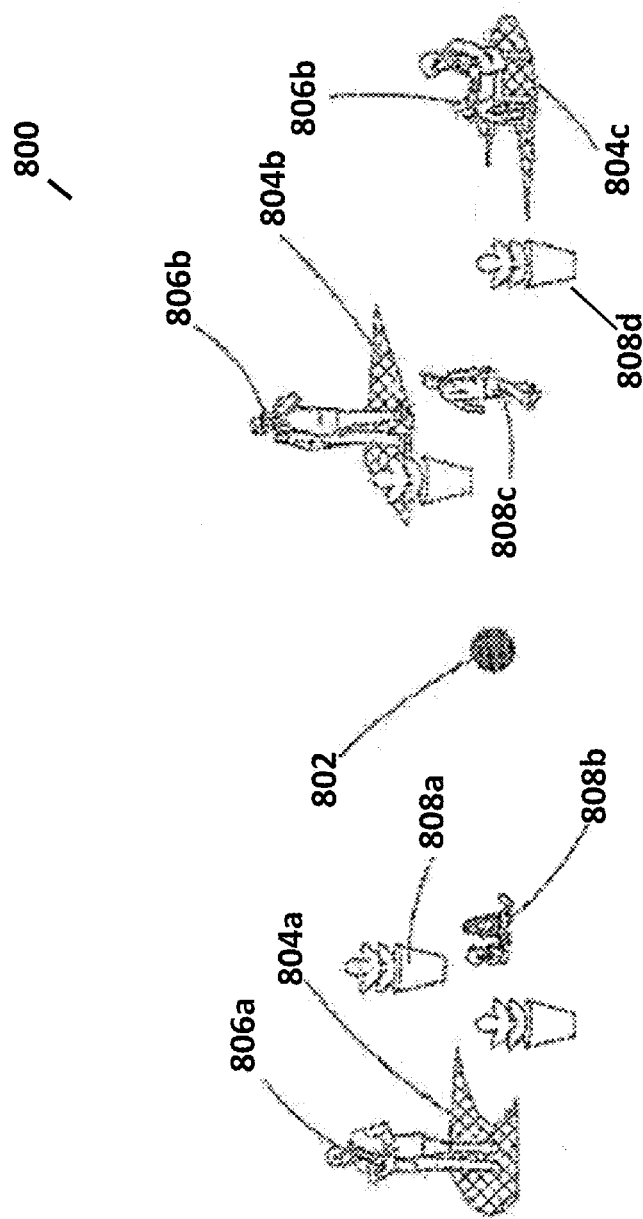
FIG. 8 illustrates wireless power transmission with selective range, where a plurality of pockets of energy may be generated along various radii from transmitter.

FIG. 8 depicts wireless power transmission with selective range 800, where a transmitter 802 may produce pocket-forming for a plurality of receivers 806. Transmitter 802 may generate pocket-forming through wireless power transmission with selective range 800, which may include one or more wireless charging spots 804. A plurality of electronic devices may be charged or powered in wireless charging spots 804. Pockets of energy may be generated over a plurality of receivers 806 regardless the obstacles 804 surrounding them. Pockets of energy may be generated by creating constructive interference, according to the principles described herein, in wireless charging spots 804. Location of pockets of energy may be performed by tacking receivers 806 and by enabling a plurality of communication protocols by a variety of communication systems such as, Bluetooth® technology, infrared communication, Wi-Fi, FM radio, among others.

G. Exemplary System Embodiment Using Heat Maps

FIGS. 9A and 9B illustrate a diagram of architecture 900A, 900B for a wirelessly charging client computing platform, according to an exemplary embodiment. In some implementations, a user may be inside a room and may hold on his hands an electronic device (e.g. a smartphone, tablet). In some implementations, electronic device may be on furniture inside the room. The electronic device may include a receiver 920A, 920B either embedded to the electronic device or as a separate adapter connected to electronic device. Receivers 920A, 920B may include all the components described in FIG. 11. A transmitter 902A, 902B may be hanging on one of the walls of the room right behind user. Transmitters 902A, 902B may also include all the components described in FIG. 11.

As user may seem to be obstructing the path between receivers 920A, 920B and transmitters 902A, 902B, RF waves may not be easily aimed to the receivers 920A, 920B in a linear direction. However, since the short signals generated from receivers 920A, 920B may be omni-directional for the type of antenna element used, these signals may bounce over the walls 944A, 944B until they reach transmitters 902A, 902B. A hot spot 944A, 944B may be any item in the room which will reflect the RF waves. For example, a large metal clock on the wall may be used to reflect the RF waves to a user's cell phone.

A micro controller in the transmitter adjusts the transmitted signal from each antenna based on the signal received from the receiver. Adjustment may include forming conjugates of the signal phases received from the receivers and further adjustment of transmit antenna phases taking into account the built-in phase of antenna elements. The antenna element may be controlled simultaneously to steer energy in a given direction. The transmitter 902A, 902B may scan the room, and look for hot spots 944A, 944B. Once calibration is performed, transmitters 902A, 902B may focus RF waves in a channel following a path that may be the most efficient paths. Subsequently, RF signals 942A, 942B may form a pocket of energy on a first electronic device and another pocket of energy in a second electronic device while avoiding obstacles such as user and furniture.

When scanning the service area, the room in FIGS. 9A and 9B, the transmitter 902A, 902B may employ different methods. As an illustrative example, but without limiting the possible methods that can be used, the transmitter 902A, 902B may detect the phases and magnitudes of the signal coming from the receiver and use those to form the set of transmit phases and magnitudes, for example by calculating conjugates of them and applying them at transmit. As another illustrative example, the transmitter may apply all possible phases of transmit antennas in subsequent transmissions, one at a time, and detect the strength of the pocket of energy formed by each combination by observing information related to the signal from the receiver 920A, 920B. Then the transmitter 902A, 902B repeats this calibration periodically. In some implementations, the transmitter 902A, 902B does not have to search through all possible phases, and can search through a set of phases that are more likely to result in strong pockets of energy based on prior calibration values. In yet another illustrative example, the transmitter 902A, 902B may use preset values of transmit phases for the antennas to form pockets of energy directed to different locations in the room. The transmitter may for example scan the physical space in the room from top to bottom and left to right by using preset phase values for antennas in subsequent transmissions. The transmitter 902A, 902B then detects the phase values that result in the strongest pocket of energy around the receiver 920a, 920b by observing the signal from the receiver 920a, 920b. It should be appreciated that there are other possible methods for scanning a service area for heat mapping that may be employed, without deviating from the scope or spirit of the embodiments described herein. The result of a scan, whichever method is used, is a heat-map of the service area (e.g., room, store) from which the transmitter 902A, 902B may identify the hot spots that indicate the best phase and magnitude values to use for transmit antennas in order to maximize the pocket of energy around the receiver.

The transmitters 902A, 902B, may use the Bluetooth connection to determine the location of the receivers 920A, 920B, and may use different non-overlapping parts of the RF band to channel the RF waves to different receivers 920A, 920B. In some implementations, the transmitters 902A, 902B, may conduct a scan of the room to determine the location of the receivers 920A, 920B and forms pockets of energy that are orthogonal to each other, by virtue of non-overlapping RF transmission bands. Using multiple pockets of energy to direct energy to receivers may inherently be safer than some alternative power transmission methods since no single transmission is very strong, while the aggregate power transmission signal received at the receiver is strong.

H. Exemplary System Embodiment

Figure 10A:
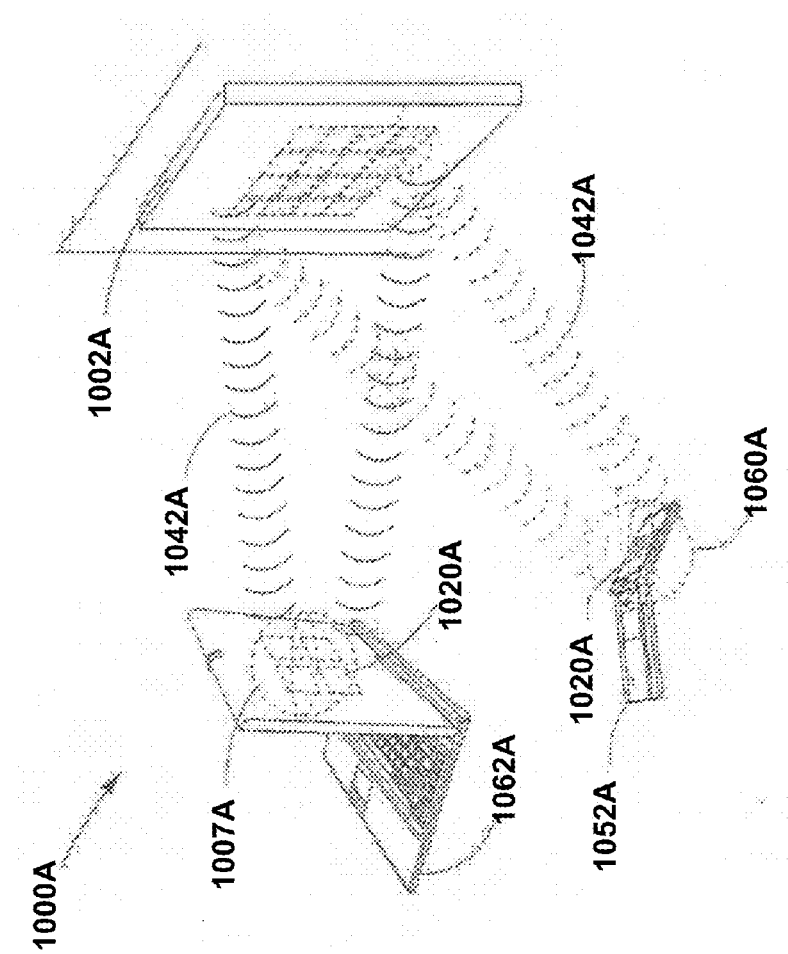
FIG. 10A illustrates wireless power transmission using multiple pocket-forming, according to an exemplary embodiment.

FIG. 10A illustrates wireless power transmission using multiple pocket-forming 1000A that may include one transmitter 1002A and at least two or more receivers 1020A. Receivers 1020A may communicate with transmitters 1002A, which is further described in FIG. 11. Once transmitter 1002A identifies and locates receivers 1020A, a channel or path can be established by knowing the gain and phases coming from receivers 1020A. Transmitter 1002A may start to transmit controlled RF waves 1042A which may converge in three-dimensional space by using a minimum of two antenna elements. These RF waves 1042A may be produced using an external power source and a local oscillator chip using a suitable piezoelectric material. RF waves 1042A may be controlled by RFIC, which may include a proprietary chip for adjusting phase and/or relative magnitudes of RF signals that may serve as inputs for antenna elements to form constructive and destructive interference patterns (pocket-forming). Pocket-forming may take advantage of interference to change the directionality of the antenna elements where constructive interference generates a pocket of energy 1060A and deconstructive interference generates a transmission null. Receivers 1020A may then utilize pocket of energy 1060A produced by pocket-forming for charging or powering an electronic device, for example, a laptop computer 1062A and a smartphone 1052A and thus effectively providing wireless power transmission.

Multiple pocket forming 1000A may be achieved by computing the phase and gain from each antenna of transmitter 1002A to each receiver 1020A. The computation may be calculated independently because multiple paths may be generated by antenna element from transmitter 1002A to antenna element from receivers 1020A.

I. Exemplary System Embodiment

Figure 10B:
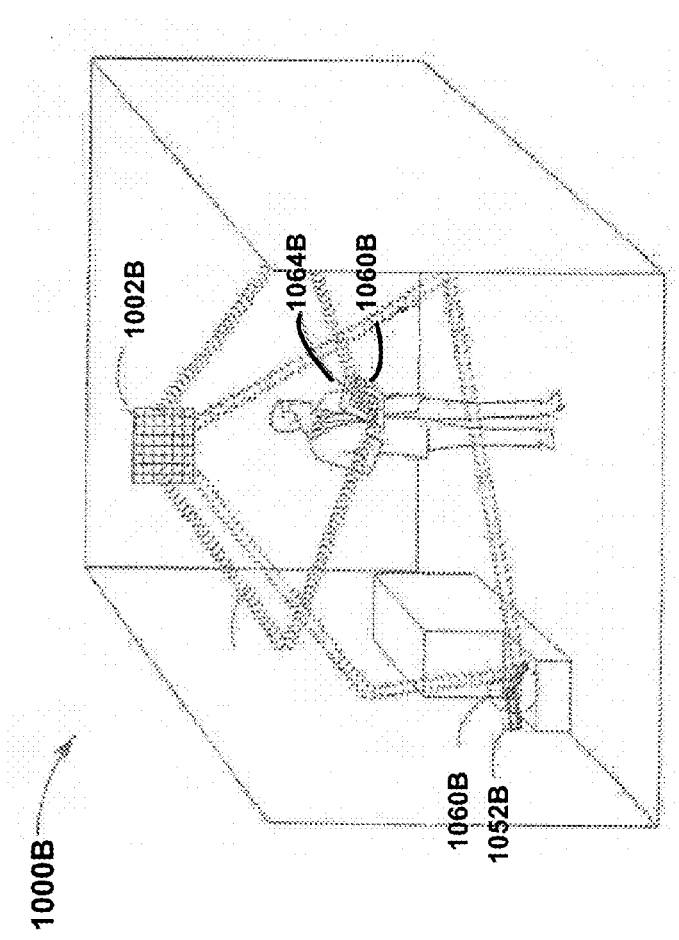
FIG. 10B illustrates multiple adaptive pocket-forming, according to an exemplary embodiment.

FIG. 10B is an exemplary illustration of multiple adaptive pocket-forming 1000B. In this embodiment, a user may be inside a room and may hold on his hands an electronic device, which in this case may be a tablet 1064B. In addition, smartphone 1052B may be on furniture inside the room. Tablet 1064B and smartphone 1052B may each include a receiver either embedded to each electronic device or as a separate adapter connected to tablet 1064B and smartphone 1052B. Receiver may include all the components described in FIG. 11. A transmitter 1002B may be hanging on one of the walls of the room right behind user. Transmitter 1002B may also include all the components described in FIG. 11. As user may seem to be obstructing the path between receiver and transmitter 1002B, RF waves 1042B may not be easily aimed to each receiver in a line of sight fashion. However, since the short signals generated from receivers may be omni-directional for the type of antenna elements used, these signals may bounce over the walls until they find transmitter 1002B. Almost instantly, a micro-controller which may reside in transmitter 1002B, may recalibrate the transmitted signals, based on the received signals sent by each receiver, by adjusting gain and phases and forming a convergence of the power transmission waves such that they add together and strengthen the energy concentrated at that location—in contrast to adding together in a way to subtract from each other and diminish the energy concentrated at that location, which is called "destructive interference" and conjugates of the signal phases received from the receivers and further adjustment of transmit antenna phases taking into account the built-in phase of antenna elements. Once calibration is performed, transmitter 1002B may focus RF waves following the most efficient paths. Subsequently, a pocket of energy 1060B may form on tablet 1064B and another pocket of energy 1060B in smartphone 1052B while taking into account obstacles such as user and furniture. The foregoing property may be beneficial in that wireless power transmission using multiple pocket-forming 1000B may inherently be safe as transmission along each pocket of energy is not very strong, and that RF transmissions generally reflect from living tissue and do not penetrate.

Once transmitter 1002B identifies and locates receiver, a channel or path can be established by knowing the gain and phases coming from receiver. Transmitter 1002B may start to transmit controlled RF waves 1042B that may converge in three-dimensional space by using a minimum of two antenna elements. These RF waves 1042B may be produced using an external power source and a local oscillator chip using a suitable piezoelectric material. RF waves 1042B may be controlled by RFIC that may include a proprietary chip for adjusting phase and/or relative magnitudes of RF signals, which may serve as inputs for antenna elements to form constructive and destructive interference patterns (pocket-forming). Pocket-forming may take advantage of interference to change the directionality of the antenna elements where constructive interference generates a pocket of energy and deconstructive interference generates a null in a particular physical location. Receiver may then utilize pocket of energy produced by pocket-forming for charging or powering an electronic device, for example a laptop computer and a smartphone and thus effectively providing wireless power transmission.

Multiple pocket-forming 1000B may be achieved by computing the phase and gain from each antenna of transmitter to each receiver. The computation may be calculated independently because multiple paths may be generated by antenna elements from transmitter to antenna elements from receiver.

An example of the computation for at least two antenna elements may include determining the phase of the signal from the receiver and applying the conjugate of the receive parameters to the antenna elements for transmission.

In some embodiments, two or more receivers may operate at different frequencies to avoid power losses during wireless power transmission. This may be achieved by including an array of multiple embedded antenna elements in transmitter 1002B. In one embodiment, a single frequency may be transmitted by each antenna in the array. In other embodiments some of the antennas in the array may be used to transmit at a different frequency. For example, ½ of the antennas in the array may operate at 2.4 GHz while the other ½ may operate at 5.8 GHz. In another example, ⅓ of the antennas in the array may operate at 900 MHz, another ⅓ may operate at 2.4 GHz, and the remaining antennas in the array may operate at 5.8 GHz.

In another embodiment, each array of antenna elements may be virtually divided into one or more antenna elements during wireless power transmission, where each set of antenna elements in the array can transmit at a different frequency. For example, an antenna element of the transmitter may transmit power transmission signals at 2.4 GHz, but a corresponding antenna element of a receiver may be configured to receive power transmission signals at 5.8 GHz. In this example, a processor of the transmitter may adjust the antenna element of the transmitter to virtually or logically divide the antenna elements in the array into a plurality patches that may be fed independently. As a result, ¼ of the array of antenna elements may be able to transmit the 5.8 GHz needed for the receiver, while another set of antenna elements may transmit at 2.4 GHz. Therefore, by virtually dividing an array of antenna elements, electronic devices coupled to receivers can continue to receive wireless power transmission. The foregoing may be beneficial because, for example, one set of antenna elements may transmit at about 2.4 GHz and other antenna elements may transmit at 5.8 GHz, and thus, adjusting a number of antenna elements in a given array when working with receivers operating at different frequencies. In this example, the array is divided into equal sets of antenna elements (e.g., four antenna elements), but the array may be divided into sets of different amounts of antenna elements. In an alternative embodiment, each antenna element may alternate between select frequencies.

The efficiency of wireless power transmission as well as the amount of power that may be delivered (using pocket-forming) may be a function of the total number of antenna elements 1006 used in a given receivers and transmitters system. For example, for delivering about one watt at about 15 feet, a receiver may include about 80 antenna elements while a transmitter may include about 256 antenna elements. Another identical wireless power transmission system (about 1 watt at about 15 feet) may include a receiver with about 40 antenna elements, and a transmitter with about 512 antenna elements. Reducing in half the number of antenna elements in a receiver may require doubling the number of antenna elements in a transmitter. In some embodiments, it may be beneficial to put a greater number of antenna elements in transmitters than in a receivers because of cost, because there will be much fewer transmitters than receivers in a system-wide deployment. However, the opposite can be achieved, e.g., by placing more antenna elements on a receiver than on a transmitter as long as there are at least two antenna elements in a transmitter 1002B.

II. Wireless Power Software Management System

A. Systems and Methods for Managing and Controlling a Wireless Power Network (Basic)

Figure 11:
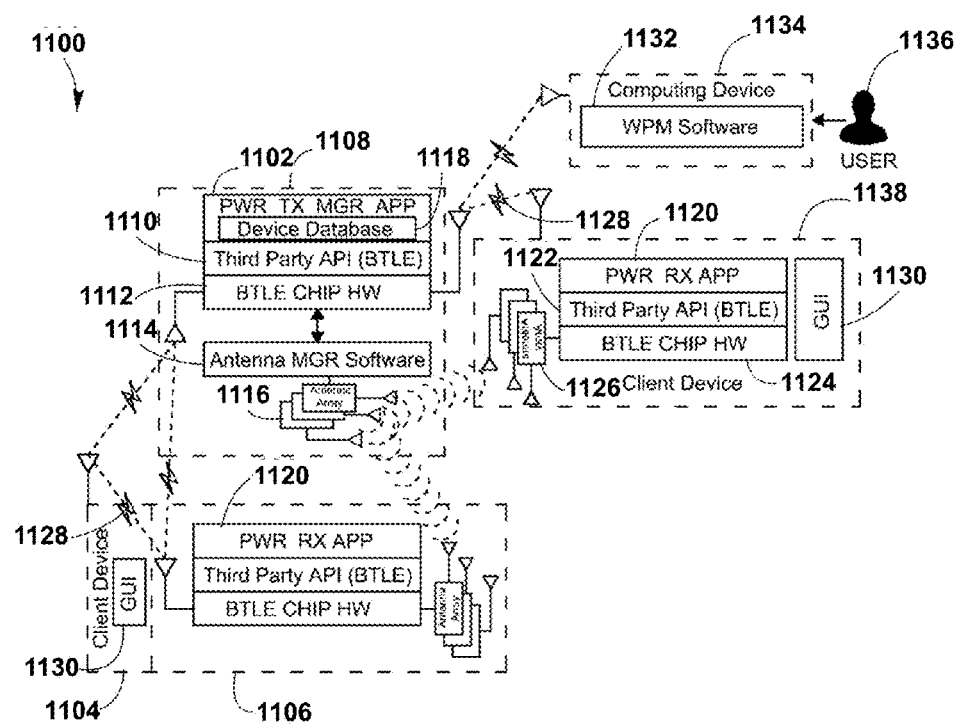
FIG. 11 illustrates an exemplary embodiment of a wireless power network including a transmitter an wireless receivers.

FIG. 11 shows an exemplary embodiment of a wireless power network 1100 in which one or more embodiments of the present disclosure may operate. Wireless power network 1100 may include communication between wireless power transmitter 1102 and one or more wireless powered receivers. Wireless powered receivers may include a client device 1104 with an adaptable paired receiver 1106 that may enable wireless power transmission to the client device 1104. In another embodiment, a client device 1104 include a wireless power receiver built in as part of the hardware of the device. Client device 1104 may be any device which uses an energy power source, such as, laptop computers, stationary computers, mobile phones, tablets, mobile gaming devices, televisions, radios and/or any set of appliances that may require or benefit from an electrical power source.

In one embodiment, wireless power transmitter 1102 may include a microprocessor that integrates a power transmitter manager app 1108 (PWR TX MGR APP) as embedded software, and a third party application programming interface 1110 (Third Party API) for a Bluetooth Low Energy chip 1112 (BLE CHIP HW). Bluetooth Low Energy chip 1112 may enable communication between wireless power transmitter 1102 and other devices such as, client device 1104. In some embodiment, Bluetooth Low Energy chip 1112 may be utilize another type of wireless protocol such as Bluetooth®, Wi-Fi, NFC, and ZigBee. Wireless power transmitter 1102 may also include an antenna manager software 1114 (Antenna MGR Software) to control an RF antenna array 1116 that may be used to form controlled RF waves that act as power transmission signals that may converge in 3-d space and create pockets of energy on wireless power receivers. Although the exemplary embodiment recites the use of RF waves as power transmission signals, the power transmission signals may include any number of alternative or additional techniques for transmitting energy to a receiver converting the transmitted energy to electrical power.

Power transmitter manager app 1108 may call third party application programming interface 1110 for running a plurality of functions such as starting a connection, ending a connection, and sending data among others. Third party application programming interface 1110 may command Bluetooth Low Energy chip 1112 according to the functions called by power transmitter manager app 1108.

Power transmitter manager app 1108 may also include a database 1118, which may store database comprising identification and attribute information of the wireless power transmitter 1102, of the receiver 1106, and of client devices 1104. Exemplary identification and attribute information includes identifiers for a client device 1104, voltage ranges for a client device 1104, location, signal strength and/or any relevant information from a client device 1104. Database 1118 may also store information relevant to the wireless power network such as, receiver ID's, transmitter ID's, end-user handheld devices, system management servers, charging schedules (information indicative of the scheduling of a charge time for the client device 1104), charging priorities and/or any data relevant to a wireless power network. Other examples of identification and attribute information include information indicative of level of power usage of one of the client device 1104; information indicative of power received at the receiver 1106 that is available to the client device 1104; and information of the duration of power usage of the client device.

Third party application programming interface 1110 at the same time may call power transmitter manager app 1108 through a callback function which may be registered in the power transmitter manager app 1108 at boot time. Third party application programming interface 1110 may have a timer callback that may go for ten times a second, and may send callbacks every time a connection begins, a connection ends, a connection is attempted, or a message is received.

Client device 1104 may include a power receiver app 1120 (PWR RX APP), a third party application programming interface 1122 (Third party API) for a Bluetooth Low Energy chip 1124 (BLE CHIP HW), and a RF antenna array 1126 which may be used to receive and utilize the pockets of energy sent from wireless power transmitter 1102.

Power receiver app 1120 may call third party application programming interface 1122 for running a plurality of functions such as start a connection, end the connection, and send data among others. Third party application programming interface 1122 may have a timer callback that may go for ten times a second, and may send callbacks every time a connection begins, a connection ends, a connection is attempted, or message is received.

Client device 1104 may be paired to an adaptable paired receiver 1106 via a BLE connection 1128. A graphical user interface (GUI 1130) may be used to manage the wireless power network from a client device 1104. GUI 1130 may be a software module that may be downloaded from any suitable application store and may run on any suitable operating system such as iOS and Android, among others. Client device 1104 may also communicate with wireless power transmitter 1102 via a BLE connection 1128 to send important data such as an identifier for the device as well as battery level information, antenna voltage, geographic location data, or other information that may be of use for the wireless power transmitter 1102.

A wireless power manager 1132 software may be used in order to manage wireless power network 1100. Wireless power manager 1132 may be a software module hosted in memory and executed by a processor inside a computing device 1134. The wireless power manager 1132 may include instructions to generate outputs and to receive inputs via a Graphical User Interface (GUI), so that a user 1136 may see options and statuses, and may enter commands to manage the wireless power network 1100. The computing device 1134 may be connected to the wireless power transmitter 1102 through standard communication protocols which may include Bluetooth®, Bluetooth Low Energy (BLE), Wi-Fi, NFC, and ZigBee®. Power transmitter manager app 1108 may exchange information with wireless power manager 1132 in order to control access and power transmission from client devices 1104. Functions controlled by the wireless power manager 1132 may include, scheduling power transmission for individual devices, priorities between different client devices, access credentials for each client, physical location, broadcasting messages, and/or any functions required to manage the wireless power network 1100.

Figure 12:
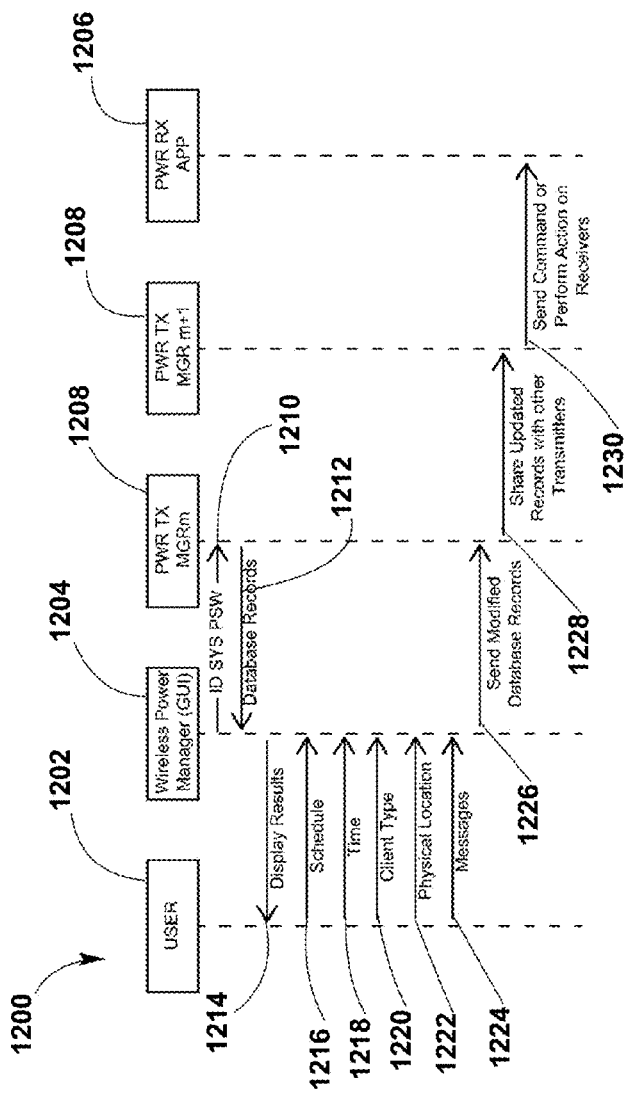
FIG. 12 shows a sequence diagram of real time communication between wireless power transmitters, wireless power receivers, a wireless power manager UI and a user, according to an embodiment.

FIG. 12 shows a sequence diagram 1200 for a real time communication between wireless powered transmitters and wireless powered receivers, according to an embodiment.

Sequence diagram 1200 illustrates the interactions between objects or roles in a wireless powered network. The objects or roles described here may include, but is not limited to, a user 1202 which manages the wireless power network, a wireless power manager 1204 which serves as a front end application for managing the wireless power network, power receiver devices with corresponding power receiver apps 1206 and transmitters with corresponding power transmitter manager apps 1208.

The process may begin when wireless power manager 1204 requests 1210 information from a power transmitter manager app 1208 hosted in a wireless transmitter. Request 1210 may include authentication security such as user name and password. Power transmitter manager apps 1208 may then verify the request 1210 and grant access to the wireless power manager 1204.

Power. Wireless power manager 1204 may continuously request 1210 information for different time periods in order to continue updating itself. Power transmitter manager app 1208 may then send database records 1212 to the wireless power manager 1204. Wireless power manager 1204 may then display 1214 these records with options in a suitable GUI to a user 1202. User 1202 may then perform different actions in order to manage the wireless power network. For example and without limitation, a user 1202 may configure powering schedules 1216 for different devices, the user 1202 may also establish priorities depending on time 1218, type of client 1220, physical location 1222 or may even choose to broadcast a message 1224 to client devices. The wireless power manager 1204 may then send 1226 the updated database records back to the power transmitter manager apps 1208.

In a wireless network power grid more than one transmitter may be used. Power transmitter manager apps 1208 hosted on each transmitter may share updates 1228 to the device database. Power transmitter manager apps 1208 may then perform an action 1230 depending on the command and updates made by the user 1202 such as, charge a wireless device, send a message to the wireless devices, set a schedule to charge different devices, set power priority to specific devices, etc.

B. Systems and Method for Wireless Transmission of Power (Basic)

Figure 13:
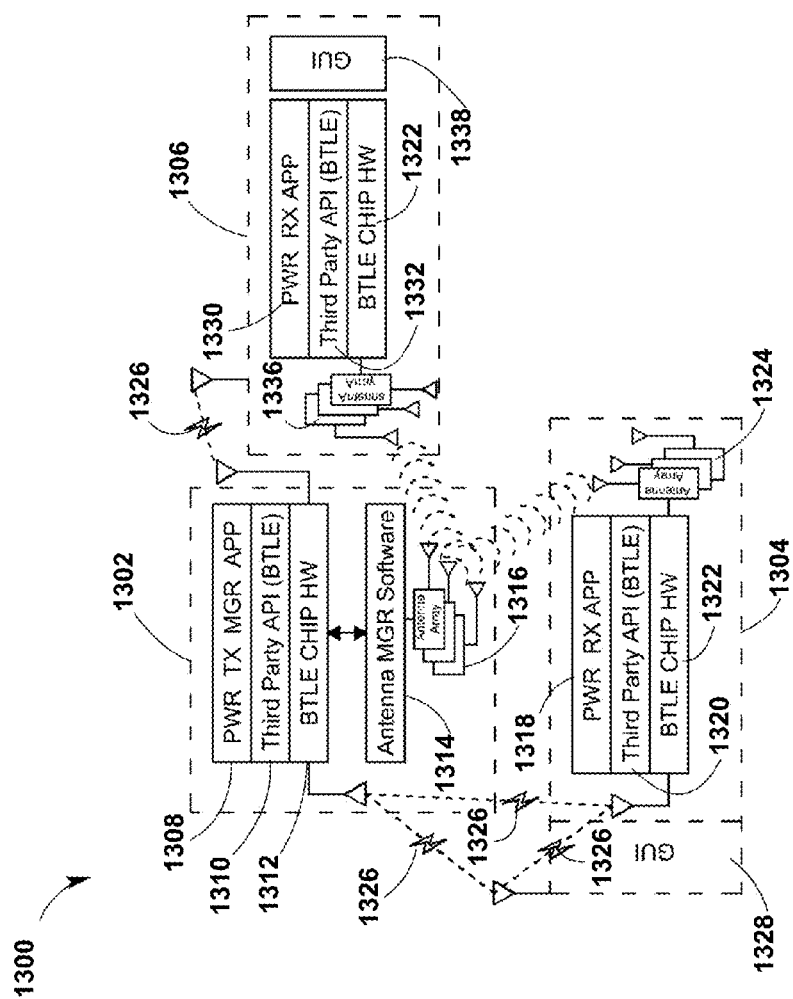
FIG. 13 shows a system architecture in which one or more embodiments of the present disclosure may operate.

FIG. 13 shows a system architecture 1300 in which one or more embodiments of the present disclosure may operate. System architecture 1300 may enable the communication controls between wireless power transmitter 1302 and one or more wireless power receivers. In some embodiments, the one or more wireless power receiver may be permanently integrated or detachably coupled to one or more customer pocket-forming enabled devices 1306, thereby forming a single integrated product or unit (integrated receiver 1304).

For example the integrated receiver 1304 could take the form of a cover of a customer pocket-forming enabled device 1306.

In one embodiment, wireless power transmitter 1302 may include a microprocessor that integrates a power transmitter manager app 1308 (PWR TX MGR APP), and a third party application programming interface 1310 (Third Party API) for a Bluetooth Low Energy chip 1312 (BLE CHIP HW). In an embodiment, Bluetooth Low Energy chip 1312 may be replaced by another type of wireless protocol such as Wi-Fi or the like. Wireless power transmitter 1302 may also include an antenna manager software 1314 (Antenna MGR Software) to control an RF antenna array 1316 that may be used to form controlled RF waves that act as power transmission signals that may converge in 3-d space and create pockets of energy on wireless power receivers. Although the exemplary embodiment recites the use of RF waves as power transmission signals, the power transmission signals may include any number of alternative or additional techniques for transmitting energy to a receiver converting the transmitted energy to electrical power.

Power transmitter manager app 1308 may store relevant information from wireless power receivers such as, identifiers, voltage ranges, location, signal strength and/or any relevant information from a wireless power receivers. For example, the power transmitter manager app 1308 may store the relevant information in a database (not shown).

Power transmitter manager app 1308 may call third party application programming interface 1310 for running a plurality of functions such as start a connection, end a connection, and send data among others. Third party application programming interface 1310 may command Bluetooth Low Energy chip 1312 according to the functions called by power transmitter manager app 1308.

Third party application programming interface 1310 at the same time may call power transmitter manager app 1308 through a callback function which may be registered in the power transmitter manager app 1308 at boot time. Third party application programming interface 1310 may have a timer callback that may go for ten times a second. Third party application programming interface 1310 may send callbacks every time a connection begins, a connection ends, a connection is attempted, or a message is received.

Integrated receivers 1304 may include a power receiver app 1318 (PWR RX 38P), a third party application programming interface 1320 (Third party API) for a Bluetooth Low Energy chip 1322 (BLE CHIP HW), and a RF antenna array 1324 which may be used to receive and utilize the pockets of energy sent from wireless power transmitter 1302.

Power receiver app 1318 may call third party application programming interface 1320 for running a plurality of functions such as start a connection, end the connection, and send data among others. Third party application programming interface 1320 may have a timer callback that may go for ten times a second and may send callbacks every time a connection begins, a connection ends, a connection is attempted, or message is received.

Integrated receivers 1304 may be paired to a wireless device such as a smartphone, or tablet via a BLE connection 1326 by using a graphical user interface (GUI 1328) that may be downloaded from any suitable application store and may run on any suitable operating system such as iOS and Android, among others. Integrated receivers 1304 may also communicate with wireless power transmitter 1302 via a BLE connection 1326 to send important data such as an identifier for the device as well as battery level information, antenna voltage, geographic location data, or other information that may be of use for the wireless power transmitter 1302.

In other embodiments, GUI 1328 may also be installed on a wireless device (smartphones or tablets) that may not have the integrated receiver 1304. GUI 1328 may perform operations to communicate with power transmitter manager app 1308 via BLE connection 1326 or any other wireless communication protocols such as Wi-Fi among others.

Customer pocket-forming enabled devices 1306 may refer to a wireless device such as smartphones, tablets, or any of the like that may include an integrated wireless power receiver chip (not shown in FIG. 1) for wireless power charging. Customer pocket-forming enabled devices 1306 may include a power receiver app 1330 (PWR RX 38P), and a third party application programming interface 1332 (Third Party API) for a Bluetooth Low Energy chip 1334 (BLE CHIP HW). Customer pocket-forming enabled devices 1306 may also include an RF antenna array 1336 which may be used to receive and utilize pockets of energy sent from wireless power transmitter 1302. GUI 1338 may be downloaded from any suitable application store and may run on any suitable operating system such as iOS and Android, among others.

Power receiver app 1330 may call third party application programming interface 1332 for running a plurality of functions such as start a connection, end the connection, and send data among others. Third party application programming interface 1332 may have a timer callback that may go for ten times a second and may send callbacks every time a connection begins, a connection ends, a connection is attempted, or message is received.

Customer pocket-forming enabled devices 1306 may also communicate with wireless power transmitter 1302 via a BLE connection 1326 to send important data such as an identifier for the device as well as battery level information, antenna voltage, geographic location data, or other information that may be of use for the wireless power transmitter 1302.

Figure 14:
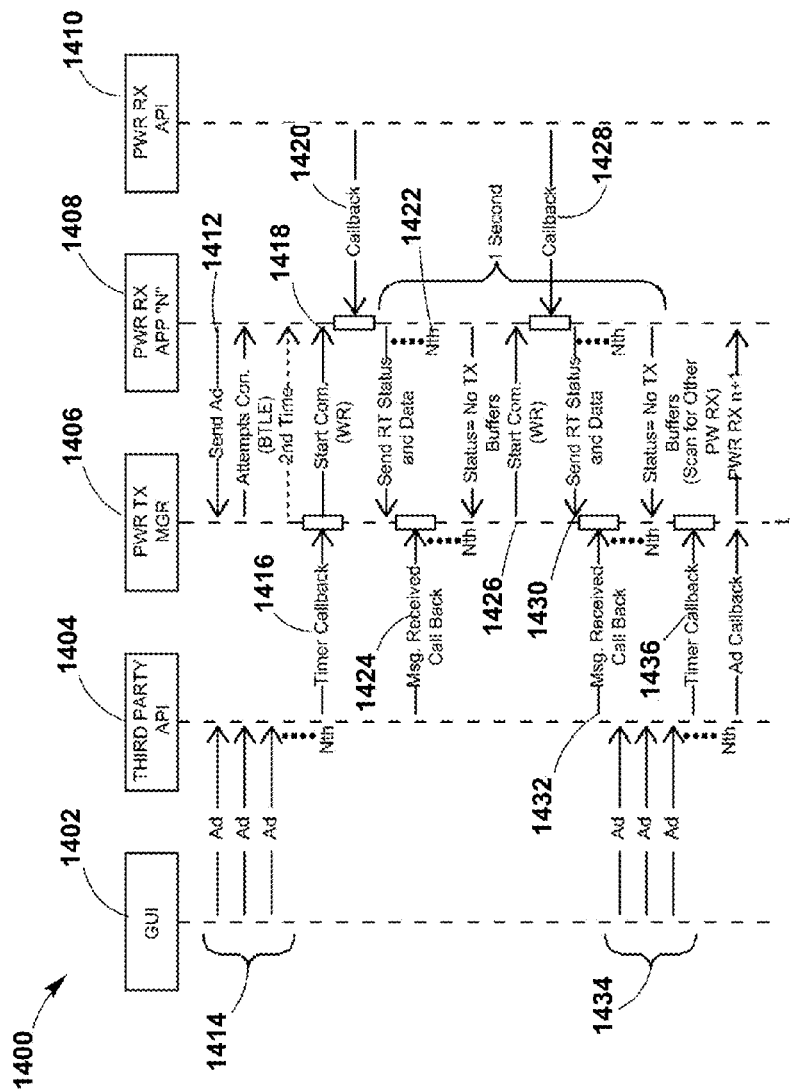
FIG. 14 shows a sequence diagram of real time communication between wireless power transmitters and wireless power receivers, according to an embodiment.

FIG. 14 shows a sequence diagram 1400 for a real time communication between wireless power transmitters and wireless power receivers, according to an embodiment.

Sequence diagram 1400 illustrates the interactions between objects or roles that allow the real time communication between a wireless power transmitter and one or more wireless power receivers. The objects or roles described here may include, but is not limited to, a GUI 1402, a third party API 1404 that controls a BLE chip embedded on the power transmitter board, a power transmitter manager app 1406, a power receiver app 1408, and a power receiver API 1410 that controls a BLE chip embedded on a wireless power receiver board.

Power transmitter manager app 1406 may first scan for power receivers ads every one second as long as its radio receiver is on. Power receiver app 1408 may continuously broadcast ads 1412 around its radio until a power transmitter manager app 1406 intercepts these ads 1412. Ads 1412 may include data such as unique IDs that may allow power transmitter manager app 1406 to identify the wireless power receiver to which is about to establish a connection. Once power transmitter manager app 1406 intercepts ads 1412, it may attempt connection one or more times until it gets connected. Interface 1402, at the same time, may continuously send ads 1414 to third party API 1404 on the transmitter board until it causes an add detection callback that may initiate timer callback 1416 in the third party API 1404. Ads 1414 may include data such as a list of power receivers to be tracked and which to be charged.

Timer callback 1416 may then trigger power transmitter manager app 1406 where power transmitter manager app 1406 may respond by sending a start communication 1418 write request message to power receiver app 1408 to initiate real time communication with power receiver app 1408. Then power receiver API 1410 may respond with a callback 1420 sent to power receiver app 1408 which may immediately trigger power receiver app 1408 by sending multiple messages including status and data 1422 of the wireless power receiver, at a rate of about 2200 packets per second, to the power transmitter manager app 1406. Status and data 1422 may include data such as antenna voltage of the wireless power receiver, battery levels, and charging status among others. In other embodiments, the transfer rate may go up to 400 packets per second but there may be problems of communication at that rate.

After status and data 1422 is received at power transmitter manager app 1406, third party API 1404 sends a message received call back 1424 to power transmitter manager app 1406. Then power transmitter manager app 1406 processes the status and data 1422 message. This process may repeat every time a status and data 1422 is received. After a certain period of time, power receiver app 1408 may send a status indicating that power receiver API 1410 is running out of transmit buffers. Subsequently, power transmitter manager app 1406 may restore the buffers by sending back a start communication 1426 write request message to the power receiver app 1408. Once the buffers are restored, a callback 1428 from the power receiver API 1410 is sent to the power receiver app 1408, triggering the software to send status and data 1430 again back to power transmitter manager app 1406 at a rate of about 2200 packets per second. Status and data 1430 may continue to send updates about antenna voltage of the wireless power receiver, battery levels, and charging status among others.

After status and data 1430 is received at power transmitter manager app 1406, third party API 1404 sends a message received call back 1432 to power transmitter manager app 1406. Then power transmitter manager app 1406 processes the status and data 1430 message. This process may repeat every time a status and data 1422 is received. After a certain period of time, power receiver app 1408 may send a status indicating that power receiver API 1410 is running out of transmit buffers. However, at this point, power transmitter manager app 1406 may check the time and realize that one second has gone since it started communication with power receiver app 1408, hence it may be time to check if there are other wireless power receivers that may need charge. Power transmitter manager app 1406 may then stop restoring buffers on power receiver API 1410 and set on a scanning mode where it listens for ads coming from GUI 1402 and power receiver 38P 1408. Subsequently, GUI 1402 may send ads 1434 to third party API 1404 which my trigger a timer callback 1436. Ads 1434 may include data such as a list of power receivers to be tracked and which to be charged. Power transmitter manager app 1406 may then process ads 1434 and establish a real time communication with the next wireless power receiver available within a period of one second.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A system for controlling communication between a wireless power transmitter and at least one wireless power receiver, the system comprising:
    a wireless power transmitter that includes:
        a first processor configured to run a power transmitter manager application;
        a first wireless communication hardware that (i) receives a broadcast signal, from at least one wireless power receiver, the broadcast signal comprising information used to identify the wireless power receiver and (ii) establishes a communication connection with the wireless power receiver that allows the wireless power receiver to send control signals comprising information that is used to determine a present location of the wireless power receiver, wherein the first wireless communication hardware has a transmitter application programming interface (API) that is used by the power transmitter manager application to instruct the first wireless communication hardware to establish the communication connection;
        a transmitter power transmission signal antenna array that, based on the control signals, transmits and adjusts controlled power transmission signals that converge to form constructive and destructive interference patterns defining a pocket of energy around the present location of the wireless power receiver; and
    the at least one wireless power receiver that includes:
        a second processor configured to run a power receiver application;
        a second wireless communication hardware that sends (i) the broadcast signal and (ii) the control signals comprising the information that is used to determine the present location of the wireless power receiver, wherein the second wireless communication hardware has a receiver API that is used by the power receiver application to instruct the second wireless communication hardware to send the broadcast signals and the control signals; and
        a receiver antenna array that receives and uses electrical power from the pocket of energy created by the wireless power transmitter.

2. The system of claim 1, wherein the transmitter power transmission signal antenna array is controlled by a transmitter antenna manager software running on the first processor, and the transmitter antenna manager software is configured to instruct the power transmission signal antenna array to transmit the controlled power transmission signals.

3. The system of claim 1, wherein the power transmitter manager application is also configured to provide a graphical user interface (GUI) used by a user to perform management tasks for the wireless power transmitter.

4. The system of claim 1, wherein the power transmitter manager application calls the transmitter API for controlling a plurality of functions of the first wireless communication hardware, the plurality of functions comprising starting a connection, ending a connection, and sending data.

5. The system of claim 4, wherein the transmitter API performs a callback to the power transmitter manager application after completion of a respective function of the plurality of functions.

6. The system of claim 1, further comprising a client device that is coupled to the at least one wireless power receiver.

7. The system of claim 6, wherein the wireless power transmitter includes a database storing information comprising identifications and attributes of the at least one wireless power receiver, and of the client device.

8. The system of claim 7, wherein respective attributes comprise voltage ranges, locations, charging schedules, charging priorities, signal strength levels, levels of power usage, or duration of power usage.

9. The system of claim 6, wherein the power transmitter manager application has access to the database.

10. The system of claim 6, wherein the control signals further comprise amount of charge received, amount of charged used, or user account information of the client device.

11. The system of claim 1, wherein the broadcast signal and the control signals are sent over a first channel and the controlled power transmission signals are sent over a second channel that is distinct from the first channel.

12. The system of claim 1, wherein the broadcast signal is sent over a first channel, the control signals are sent over a second channel, and the controlled power transmission signals are sent over a third channel, wherein the first channel, the second channel and the third channel are distinct from one another.

13. The system of claim 3, wherein the user uses the GUI to configure one or more of the following management tasks: configuring power schedules for a plurality of client devices, configuring charging priorities between the plurality of client devices, configuring types of the client devices, and sending messages to the client devices.

14. The system of claim 1, wherein the first wireless communication hardware and the second wireless communication hardware are BLUETOOTH radios.

15. The system of claim 1, wherein the first wireless communication hardware and the second wireless communication hardware are WI-FI radios.

16. The system of claim 1, wherein the first wireless communication hardware and the second wireless communication hardware are ZIGBEE radios.

17. A non-transitory computer-readable storage medium comprising executable instructions for controlling wirelessly transmitted power that, when executed by a processor of a wireless power transmitter, cause the processor to perform operations comprising:
  at the wireless power transmitter that includes the processor, a wireless communication hardware having a transmitter application programming interface (API), and a transmitter wireless antenna array:
    running, by the processor, a power transmitter manager application;
    causing, by the power transmitter manager application using the transmitter API, the wireless communication hardware to (i) receive a broadcast signal, from at least one wireless power receiver, the broadcast signal comprising information used to identify the wireless power receiver and (ii) establish a communication connection with the wireless power receiver that allows the wireless power receiver to send control signals comprising information that is used to determine a present location of the wireless power receiver,
    instructing, by the power transmitter manager application, the transmitter wireless antenna array, based on the control signals, to transmit and adjust controlled wireless power waves that converge to form constructive and destructive interference patterns defining a pocket of energy around the present location of the wireless power receiver.

* * * * *

UNITED STATES PATENT AND TRADEMARK OFFICE
CERTIFICATE OF CORRECTION

PATENT NO. : 10,153,653 B1
APPLICATION NO. : 14/586542
DATED : December 11, 2018
INVENTOR(S) : Bell et al.

Page 1 of 1

It is certified that error appears in the above-identified patent and that said Letters Patent is hereby corrected as shown below:

In the Claims

Claim 10, Column 33, Line 29, please delete "charged used" and insert --charge used--.

Signed and Sealed this
Nineteenth Day of February, 2019

Andrei Iancu
*Director of the United States Patent and Trademark Office*